US012118321B2

(12) United States Patent
Cohen et al.

(10) Patent No.: US 12,118,321 B2
(45) Date of Patent: Oct. 15, 2024

(54) COLLABORATIVE PLAN-BASED DIALOGUE SYSTEM AND METHOD

(71) Applicant: Openstream Inc., Bridgewater, NJ (US)

(72) Inventors: Philip R. Cohen, Deer Harbor, WA (US); Lucian Galescu, Rochester, NY (US); Rajasekhar Tumuluri, Bridgewater, NJ (US)

(73) Assignee: Openstream Inc., Bridgewater, NJ (US)

( * ) Notice: Subject to any disclaimer, the term of this patent is extended or adjusted under 35 U.S.C. 154(b) by 0 days.

(21) Appl. No.: 18/397,749

(22) Filed: Dec. 27, 2023

(65) Prior Publication Data
US 2024/0242035 A1    Jul. 18, 2024

Related U.S. Application Data

(60) Provisional application No. 63/435,643, filed on Dec. 28, 2022.

(51) Int. Cl.
*G06F 40/35* (2020.01)
(52) U.S. Cl.
CPC ................................. *G06F 40/35* (2020.01)
(58) Field of Classification Search
CPC ................................. G06F 40/35; G10L 15/22
See application file for complete search history.

(56) References Cited

U.S. PATENT DOCUMENTS

| 5,748,841 A * | 5/1998 | Morin ....................... G06F 3/16 704/E15.044 |
| 6,570,555 B1 * | 5/2003 | Prevost .................... G06F 3/038 345/156 |
| 7,069,215 B1 * | 6/2006 | Bangalore ............... G10L 15/24 382/187 |

(Continued)

OTHER PUBLICATIONS

Kripke, S. A. Semantical Considerations on Modal Logic Acta Philosophica Fennica 16 1963, 83-94.

(Continued)

*Primary Examiner* — Eric Yen
(74) *Attorney, Agent, or Firm* — Young Basile Hanlon & MacFarlane, P.C.

(57) ABSTRACT

Methods and systems for multimodal collaborative conversational dialogue are disclosed. The multimodal collaborative conversational dialogue system include a multimodal avatar interface and one or more sensors, which obtains one or more multimodal inputs. A multimodal semantic parser generates one or more logical form representations based on the one or more multimodal inputs. A collaborative dialogue manager infers a goal of the user from the one or more logical form representations, and develops a plan including communicative actions and non-communicative actions with regard to the goal. The multimodal avatar interface outputs one or more multimodal collaborative plan-based dialogue system-generated communications with respect to execution of at least one communicative action. The collaborative dialogue manager maintains a collaborative dialogue with the user until obtainment of the goal.

20 Claims, 21 Drawing Sheets

(56) References Cited

U.S. PATENT DOCUMENTS

| | | | | |
|---|---|---|---|---|
| 2003/0097249 | A1* | 5/2003 | Walker | G06F 40/35 |
| | | | | 704/275 |
| 2006/0123358 | A1* | 6/2006 | Lee | G06F 40/35 |
| | | | | 704/9 |
| 2011/0320187 | A1* | 12/2011 | Motik | G06F 16/3344 |
| | | | | 704/9 |
| 2017/0278514 | A1* | 9/2017 | Mathias | G06F 16/35 |
| 2018/0121500 | A1* | 5/2018 | Reschke | G06F 16/2428 |
| 2018/0307679 | A1* | 10/2018 | Duong | G06N 3/082 |
| 2019/0236469 | A1* | 8/2019 | Canim | G06N 5/045 |
| 2023/0394413 | A1* | 12/2023 | Das | G06Q 10/06375 |

OTHER PUBLICATIONS

Jiang, T., and Riloff, E., Learning prototypical goal activities for locations, Proc. of Assoc. for Comp. Ling., 2018, 1297-1307.

Larsson, S. and Traum, D. R., Information state and dialogue management in the TRINDI Dialogue Move Engine Toolkit, Natural Language Engineering 6(3-4), 2000, 323-340.

Litman, D. J. and Allen, J. F., A Plan Recognition Model for Subdialogues in Conversations, Cognitive Science, 11, 1987, 163-200.

McDermott, D., Ghallab, M., Howe, A., ;Knoblock, C., Ram, A., Veloso, M., Weld, D., Wilkins, D., (1998). PDDL—The Planning Domain Definition Language, Technical Report CVC TR98003/DCS TR1165. New Haven, CT: Yale Center for Computational Vision and Control.

McShane, M., English, J., and Nierenburg, S. , Knowledge engineering in the long game of Artificial Intelligence: The case of speech acts, Proc. of Advances in Cognitive Systems, 9, 2021.

Miller, T. Explanation in artificial intelligence: Insights from the social sciences, Artificial Intelligence 267 (C):1-38 (2019).

Miller, T., Felli, P., Muise, C., Pearce, A. R., and Sonenberg, L. 'Knowing whether' in Proper Epistemic Knowledge Bases, Proc. of AAAI, 2017.

Moore, Robert C, Reasoning about knowledge and action, Proc. of IJCAI, 1977.

Mueller, S. T., Hoffman, R. R., Clancey, W., Emrey, A., Klein, G., Explanation in Human-AI Systems: A Literature Meta-Review Synopsis of Key Ideas and Publications and Bibliography for Explainable AI, DARPA XAI Program, Feb. 2019.

Muise, C. M., Chakraborti, T., Agarwal, S., Bajgar, O., Chaudhary, A., Lastras-Montaño, L. A., Ondrej, J., Vodolán, M., Wiecha, C., (2019) Planning for goal-oriented dialogue systems, https://doi.org/10.48550/arXiv.1910.08137.

Nau, D. S., Au, T. C., Ilghami, O., Kuter, U., Murdock, J. W., Wu, D., Yaman, F SHOP2: An HTN planning system, Journal of Artificial Intelligence Research 20, 379-404.

Perrault, C. R. An application of default logic to speech act theory, Intentions in Communication (Cohen, P. R., Morgan, J., and Pollack, M. E., eds.), MIT Press, 1990.

Perrault, C. R. and Allen, J. F., A plan-based analysis of indirect speech acts, Computational Linguistics, 6(3-4), 1980, 167-182.

Perrault, C. R., Allen, J. F., and Cohen, P. R. 1978. Speech acts as a basis for dialogue coherence, Proc. of Theoretical Issues in Natural Language Processing (TINLAP-2), D. Waltz (ed.), University of Illinois , pp. 125-132.

Petrick, R. P.A. and Foster, M. E., Planning for social interaction in a robot bartender domain, International Conference on Automated Planning and Scheduling (ICAPS 2013), 389-397.

Pollack, M. E. Plans as complex mental attitudes, in Intentions in Communication, Cohen, P. R., Pollack, M.E., and Morgan, J. (eds.), Cambridge: MIT Press, 77-104.

Quine, W. V. O. Quantifiers and propositional attitudes, Journal of Philosophy 53(5), 1956, 177-187.

Rao, A. S. and M. P. Georgeff: 1991, 'Modelling rational agents within a BDI-architecture'. In: Proc. 2nd International Conference on Principles of Knowledge Representation, AAAI Press.

Rao, A. and Georgeff, M. BDI-agents: From theory to practice. Proceedings of the First International Conference on Multiagent Systems, 1995.

Rao, A. and Georgeff, M. Decision procedures for BDI logics, Journal of Logic and Computation 8(3), 1998.

Reiter, R. A logic for default reasoning. Artificial Intelligence 13:81-132, 1980.

Rich, C. and Sidner, S. L. 1997. Collagen: When agents collaborate with people. In Readings in Agents, edited by M. Huhns and M. Singh, San Francisco: Morgan Kaufmann Publishers.

Sacerdoti, E. D. A Structure for Plan and Behavior, Elsevier-North Holland. 1977.

Sadek, D., Bretier, P., and Panaget, F., ARTIMIS: Natural dialogue meets rational agency, Proc. IJCAI-15, 1997, pp. 1030-1035.

Sardiña, S., Padgham, L. A BDI agent programming language with failure handling, declarative goals, and planning. Autonomous Agents and Multi-Agent Systems 23, 18-70 (2011). https://doi.org/10.1007/s10458-010-9130-9.

Sardiña, S., De Silva, L., Padgham, L., Hierarchical planning in BDI agent programming languages: A formal approach, Proceedings of the Fifth International Joint Conference on Autonomous Agents and Multiagent Systems, 2006, pp. 1001-1008.

Sarkadi, S., Panisson, A. R., Bordini, R. H., McBurney, P., Parsons, S., Chapman M., Modelling deception using theory of mind in multi-agent systems. 2019. AI Communications Journal, Special Issue on Agreement Technologies, Marin Lujak (Ed.).

Schatzmann, J., Thomson, B., Weilhammer, K., Ye, H., and Young, S., Agenda-based user simulation for bootstrapping a POMDP dialogue system, Proc. of NAACL-HLT, 2007.

Shah, P., Hakkani-Tür, D., Tür, G., Rastogi, A., Bapna, A., Nayak, N., Heck, L., Building a conversational agent overnight with dialogue self-play, arXiv: 1801.04871v1, Jan. 2018.

Shieber, S., van Noord, G., Pereira, F. C. N., and Moore, R. C. Semantic head-driven generation, Computational Linguistics, 16(1):30-42.

Sidner, C. L., Plan parsing for intended response recognition in discourse. Computational Intelligence, 1(1), 1985, https://doi.org/10.1111/j.1467-8640.1985.tb00054.x.

Steedman, M. and Petrick, R. Planning dialogue actions, Proc. of SigDial, 2007.

Shoham, Y. Logical Theories of Intention and the Database Perspective. 2009, Journal of Philsophical Logic DOI 10.1007/s10992-009-9116-8.

Shvo, M. McIlraith, S. A. Active goal recognition, Proceedings of the AAAI Conference on Artificial Intelligence 34 (06), 9957-9966.

Shvo, M. Klassen, T. Q., Sohrabi, S. McIlraith, S. A. Epistemic plan recognition, Proceedings of the 19th International Conference on Autonomous Agents and MultiAgent Systems, AAAI Press, 2020, 1251-1259.

Shvo, M. Klassen, T. Q., McIlraith, S. A. Towards the role of theory of mind in explanation, International 2020, 75-93.

Shvo, M., Hari, R. , O'Reilly, Z., Abolore S., Wang, S. Y. N., Sheila A. McIlraith, S. A. Proactive Robotic Assistance via Theory of Mind, International Conference on Intelligent Robots and Systems (IROS 2022), Kyoto, Japan, 2022.

Stone, M. Intention, interpretation and the computational structure of language, Cognitive Science 28, 2004, 781-809.

Swartout, W. R., Moore, J. D., Explanation in second generation expert systems, Second Generation Expert Systems, Springer, Berlin, 1993, 543-585.

Teixeira, M. S. and Dragoni, M., A review of plan-based approaches to dialogue management, Cognitive Computation, 14:1019-1038, 2022.

Traum, D., Allen, J. F., A "speech acts" approach to grounding in conversation, 2nd International Conference on Spoken Language Processing (ICSLP 1992), 1992.

Traum , D. R. and Allen, J. F. Discourse Obligations in Dialogue Processing, Proc. Association for Computational Linguistics, 1994.

Traum, D. R. and Hinkelman, E. A., Conversation acts in task-oriented spoken dialogue, Computational Intelligence, 8(3), 575-599.

(56) References Cited

OTHER PUBLICATIONS

Traum, D. R., Swartout, W., Gratch, J., Marsella, S. A virtual human dialogue model for non-team interaction, Recent Trends in Discourse and Dialogue, Springer, 2008, 45-67. https://doi.org/10.1007/978-1-4020-6821-8_3.
Van der Hoek, W., & Wooldridge, M. (2003). Towards a logic of rational agency. Logic Journal of the IGPL, 11(2), 135-160.
Van der Hoek, W., Jamroga, W., Wooldridge, M. 2007. Towards a theory of intention revision, Synthese: Knowledge, Rationality & Action 155:265-290. DOI 10.1007/s11229-006-9145-6.
Vilain, M. Getting serious about parsing plans: A grammatical analysis of plan recognition, Proc. of AAAI-90, 190-197.
Wang, Y., Berant, J., and Liang, P., Building a semantic parser overnight, Proc. of Assoc. for Comp. Ling., 2015, 1332-1342.
Wen, T. H., Miao Y., Blunsom, P., Young, S. Latent Intention Dialogue Models, Proceedings of the 34th International Conference on Machine Learning, Sydney, Australia, PMLR 70, 2017.
Wilkins, D. E. Practical planning: extending the classical AI planning paradigm , Elsevier, 2014.
Williams, J. D., Henderson, M., Raux, A., Thomson, B., Black, A., Ramachandran, D. (2104) The Dialog StateTracking Challenge Series, AI Magazine, Winter, pp. 121-124.
Horvitz, E., Reflections on challenges and promises of mixed-initiative interaction, AI Magazine, 28(2), 2007, 19-22.
Traum, David & Larsson, Staffan. "The Information State Approach to Dialogue Management", 30 pages, Jan. 2003, DOI: 10.1007/978-94-010-0019-2_15.
Alexandros Papangelis and Mahdi Namazifar and Chandra Khatri and Yi-Chia Wang and Piero Molino and Gokhan Tur, "Plato Dialogue System: A Flexible Conversational AI Research Platform", arXiv, Pre-print, 13 pages, Jan. 2020, DOI: 10.48550/arXiv.2001.06463.
Halpern, Joseph Y., "Reasoning About Knowledge: A Survey", (1995) Oxford University Press, Inc., Handbook of Logic in Artificial Intelligence and Logic Programming (vol. 4): Epistemic and Temporal Reasoning.
Wilkins, David E. (1984). Domain-independent planning Representation and plan generation. Artificial Intelligence 22(3):269-301. DOI: 10.1016/0004-3702(84)90053-5.
Sharon Oviatt, Bjorn Schuller, and Philip Cohen, "The Handbook of Multimodal-Multisensor Interfaces, vol. 3: Language Processing, Software, Commercialization, and Emerging Directions", ACM Books, 109 pages, Jun. 2019, ISBN: 9781970001723.
Allen, J. and Ferguson, G. (2002) Human-Machine Collaborative Planning. Proceedings of the Third International NASA Workshop on Planning and Scheduling for Space, Houston, TX, Oct. 27-29.
Allen, J. F. and Perrault, C. R., Analyzing intention in utterances, Artificial Intelligence 15(3), 143-178.
Allen, J. F., Schubert, L K., Ferguson, G. Heeman, P. Hwang, C. H., Kato, T., Light, M. Martin, N., Miller, B., Poesio, M., Traum, D. R., The TRAINS project: A case study in building a conversational planning agent. Journal of Experimental and Theoretical Artificial Intelligence, 1995.
Allen, J., Byron, D. Dzikovska, M., Ferguson, G., Galescu, L., and Stent, A. (2001). Towards conversational human-computer interaction, AI Magazine 22(4), pp. 27-38, Winter.
Allen, J., Dzikovska, M. O., Manshadi, M., & Swift, M. (2007). Deep linguistic processing for spoken dialogue systems. In /ACL 2007 Workshop on Deep Linguistic Processing (pp. 49-56).
Allen, J. F., André, E., Cohen, P. R., Hakkani-Tür, D., Kaplan, R., Lemon, O., Traum, D., Challenge discussion: Advancing multimodal dialogue, Chapter 5 in Handbook of Multimodal-Multisensor Interfaces, vol. 3, Oviatt, S. L., Schuller, B., Cohen, P. R., Sonntag, D., Potamianos, G., and Krüger, A., ACM Press/Morgan and Claypool Publishers, 2019.
Allen, J., L. Galescu, C. M. Teng, and I. Perera. "Conversational Agents for Complex Collaborative Tasks." AI Magazine 41, No. 4 (2020): 54-78. https://doi.org/10.1609/aimag.v41i4.7384.
Appelt, D. Planning English Sentences, Cambridge University Press, Cambridge, UK, 1985.

Barcan, R. C., A Functional Calculus of First Order Based on Strict Implication, Journal of Symbolic Logic, 11, 1946.
Bobrow, D. G., Kaplan, R. M., Kay, M., Norman, D. A., Thompson, H., and Winograd, T. GUS, a frame-driven dialog system. Artificial Intelligence, 8(2), 1977, 155-173.
Bohus, D. and Rudnicky, A. I., The RavenClaw dialogue management framework, Computer Speech and Language, 23, 2009, 332-361.
Bolander, T., and Andersen, M. B., Epistemic planning for single- and multi-agent systems, Journal of Applied Non-Classical Logics , 21(1) , 2011, 9-34.
Cohen, P. R. On knowing what to say: Planning speech acts. PhD Thesis, Dept. of Computer Science, University of Toronto, 1978.
Cohen, P. R. Foundations of task-oriented dialogue: What's in a slot? 2019. Proceedings of the 20th SigDial meeting, Stroudsburg, PA:Association. for Computational Linguistics.
Cohen, P. R., Back to the future for dialogue research, Proc. of AAAI, 2020.
Cohen, P. R. and Levesque, H. J., Intention is choice with commitment, Artificial Intelligence 42 (2-3), 1990a, 213-261.
Cohen, P. R, and Levesque, H. J. , Rational Interaction as the Basis for Communication, Intentions in Communication, Cohen, P. R., Morgan, J. and Pollack, M.E., MIT Press, 1990b.
Cohen, P. R. and Levesque, H. J. 1991a, Teamwork, Noûs: Special Issue on Cognitive Science and Artificial Intelligence, 25(4):487-512.
Cohen, P. R. and Levesque, H. J. 1991b. Confirmations and joint action. In Proceedings of International Joint Conference on Artificial Intelligence—91, 951-957.
Cohen, P. R. and Perrault, C. R., Elements of a plan-based theory of speech acts, Cognitive Science, 3(3), 1979.
Cohen, P. R., Perrault, C. R., and Allen, J. F., Beyond question-answering, in Strategies for Natural Language Processing, Lehnert, W. and Ringle, M. (eds)., Lawrence Erlbaum Associates, 1982.
Cohen, P. R.; Levesque, H. J.; Nunes, J. H. T.; and Oviatt S. L. 1990. Task-oriented dialogue as a consequence of joint activity, Pacific Rim International Conf. on Artificial Intelligence, 203-209.
Dalton, A., Aghaei, E., Al-Shaer, E., Bhatia, A., Castillo, E., Cheng, Z., Dhaduvai, S., Duan, Q., Hebenstreit, B., Islam, M. M., Karimi, Y., Masoumzadeh, A., Mather, B., Santhanam, S., Shaikh, S., Zemel, A., Strzalkowski, T., Dorr, B. 2020. Active defense against social engineering: The case for human language technology, Proceedings for the First International Workshop on Social Threats in Online Conversations: Understanding and Management, pp. 1-8.
De Silva, L., Sardiña, S., & Padgham, L. (2009). First Principles Planning in BDI Systems. Proceedings of the 8th International Conference on Autonomous Agents and Multiagent Systems, 1105-1112.
De Silva, L., Padgham, L. and Sardina, S., (2019) HTN-Like Solutions for Classical Planning Problems: An Application to BDI Agent Systems, Theoretical Computer Science, 763, Apr. 4, pp. 12-37.
Duong, L., Afshar, H., Estival, D., Pink, G., Cohen, P. R., and Johnson M. Multilingual Semantic Parsing and Code-switching, Proc. of the 21st Conf. on Computational Natural Language Learning (CoNLL 2017), 2017, pp. 379-389.
Fagin, R., Halpern, J. Y., Moses, Y., & Vardi, M. Y. (2003). Reasoning About Knowledge. MIT Press, Cambridge, MA, USA.
Ferguson, G., and Allen, J. (2007). Mixed-Initiative Dialogue Systems for Collaborative Problem-Solving. AI Magazine, Special Issue on Mixed-Initiative Assistants 28(2):23-32, AAAI Press.
Ferguson, G., and Allen, J. (2011). A Cognitive Model for Collaborative Agents. Proceedings of the AAAI 2011 Fall Symposium on Advances in Cognitive Systems. Washington, DC.
Fikes, R. E. and Nilsson, N. J. 1971. STRIPS, A new approach to the application of theorem proving to problem solving, Artificial Intelligence, 2(3-4):189-208. Science Direct. doi.org/10.1016/0004-3702(71)90010-5.
Galescu, L., Teng, C. M., Allen J. F., and Pereira, I. Cogent: A Generic Dialogue System Shell Based on a Collaborative Problem Solving Model, Proceedings of SigDial, 2018, 400-409.
Gašic, M., Mrkši?, N., Rojas-Barahona, L. M., Su, P-H., Ultes, S., Vandyke, D., Wen, T-H., and Young, S., Dialogue manager domain

(56) References Cited

OTHER PUBLICATIONS adaptation using Gaussian process reinforcement learning, Computer Speech and Language 45, 2016, 552-569.

Geib, C. and Goldman, R. Recognizing plans with loops represented in a lexicalized grammar. 2011. Proc. of the 25th Conference on Artificial Intelligence (AAAI), AAAI Press, pp. 958-963.

Geib, C., Weerasinghe, J., Matskevich, S. Kantharaju, P., Craenen, B., and Petrick, P. A. Building helpful virtual agents using plan recognition and planning. 2016. Proc. of the 12th AAAI Conference on Artificial Intelligence and Interactive Digital Entertainment (AIIDE-16), 162-168.

Geib, C., George, D., Khalid, B., Magnotti, R., and Stone, M., An integrated architecture for common ground in collaboration, Advances in Cognitive Systems, 10, 2022, 1-20.

Georgeff, M. P. and Lansky, A. L. Reactive reasond and planning, Proc. of AAAI-87, 1987, pp. 677-682.

Gratch, J. and Marsella, S., A domain-independent framework for modeling emotion, Cognitive Systems Research 5, 2004, pp. 269-306.

Grice, H.P. Logic and Conversation, Syntax and Semantics, vol. 3 P. Cole and J. Morgan (eds.), Academic Press, 1975.

Grosz, B. J. and Sidner, C., 1986. Attention, intentions, and the structure of discourse, Computational Linguistics, 12(3):175-204.

Grosz, B. J. and Sidner, C. 1990. Plans for discourse, in Intentions in Communication, edited by P. R., Cohen, J., Morgan, and M. E., Pollack, Cambridge, MA: MIT Press.

Gutierrez, J., Kraus, S., Perelli, G. and Wooldridge, M. Giving Instructions in Linear Temporal Logic, Proc. of 29th International Symposium on Temporal Representation and Reasoning (Time 2022), Alexander Artikis, Roberto Posenato, and Stefano Tonetta (eds.); Leibniz International Proceedings in Informatics, Schloss Dagstuhl—Leibniz-Zentrum für Informatik, Dagstuhl Publishing, Germany, 2022, pp. 15:1-15:14.

Harel, D., Kozen, D., & Tiuryn, J. (2000). Dynamic logic. Cambridge: MIT.

Henderson, M., Machine learning for dialog state tracking: A review, Proceedings of the First International Workshop on Machine Learning in Spoken Language Processing, 2015.

Herzig, A. and Longin, D. C&L intention revisited. (2004). Proceedings of the 9th International Conference on Knowledge Representation and Reasoning, AAAI Press, pp. 527-535.

Holler, D., Behnke, G. Bercher, P., Biundo, S., Fiorino H., Pellier, D., Alford, R., HDDL—A Language to Describe Hierarchical Planning Problems, Proc. of International Workshop on HTN Planning (ICAPS), 2019.

Icard, T.; Pacuit, E.; and Shoham, Y. 2010. Joint revision of belief and intention. In Proceedings of the Twelfth International Conference on Principles of Knowledge Representation and Reasoning (KR 2010), Palo Alto: AAAI Press. 163-200.

Johnson B., Floyd M.W., Coman A., Wilson M.A., Aha D.W. Goal reasoning and trusted autonomy. In: Abbass H., Scholz J., Reid D. (eds), Foundations of Trusted Autonomy. Studies in Systems, Decision and Control, vol. 117. Springer, 47-66, 2018.

Kaplan, D. Quantifying in, Synthese 19(1/2), 1968, 178-214.

Kaptein, F., Broekens, J., Hindriks, K., and Neerincx, M., Personalised Self-Explanation by Robots: The Role of Goals versus Beliefs in Robot-Action Explanation for Children and Adults, Proc. of ROMAN 2017, Aug., 2017, DOI: 10.1109/ROMAN.2017.8172376.

Kraus, M., Wagner, N., Callejas, Z., , Minker, W., The Role of Trust in Proactive Conversational Assistants, IEEE Access, Aug. 18, 2021. doi10.1109/Access.2021.3103893.

\* cited by examiner

*System asks a Whq to Usr about the time Usr wants to make an appointment* $\underbrace{\phantom{xxxxxxxxxxxxxxxxxxxxxx}}_{\text{"Slot"}}$

*Precondition: Listener knows the referent of the time User wants to make an appointment*

*Effect: Speaker knows the referent of the time User wants to make an appointment*

FIG. 4

| UTTERANCE | SYSTEM REASONING | PLAN ELEMENTS | |
|---|---|---|---|
| *S to CVS: Do you have covid vaccine available?* | S does not know if vaccine is available there, but believes that the vaccine center KNOWSIF it is available. So, S plans and executes a Y/N question to CVS about availability | System needs to determine whether 11/30/21 covid vaccination center has covid vaccine | PGOAL |
| | | System intends to ask Covid vaccination center whether 11/30/21 covid vaccination center has covid vaccine | INTENTION |
| | | System asked Covid vaccination center 11/30/21 covid vaccination center has covid vaccine | ACT |

FIG. 6C

| UTTERANCE | SYSTEM REASONING |
|---|---|
| *CVS to S: Yes* | S now comes to believe that the vaccine center has vaccine |

FIG. 6D

| UTTERANCE | SYSTEM REASONING | PLAN ELEMENTS |
|---|---|---|
| *S: The reason is that I need to determine whether you are eligible for the Covid vaccine* | S accesses its plan in order to determine what pgoals/intentions the previously requested action depends upon. S provides an answer based on its pgoal to knowif eligible(U). | |

FIG. 6I

| UTTERANCE | SYSTEM REASONING | PLAN ELEMENTS |
|---|---|---|
| U: 55 years old | | |

FIG. 6K

| UTTERANCE | SYSTEM REASONING | PLAN ELEMENTS |
|---|---|---|
| S: Are you caring for someone who is disabled? | This particular eligibility rule says that a person is eligible for the Covid vaccine if they are more than 50 years old and caring for someone who is disabled. S meta-interprets this rule | |

FIG. 6L

| UTTERANCE | SYSTEM REASONING | PLAN ELEMENTS |
|---|---|---|
| U: Yes | | |

FIG. 6M

| UTTERANCE | SYSTEM REASONING | PLAN ELEMENTS |
|---|---|---|
| S: OK, you are eligible to receive a covid vaccine | S confirms the satisfaction of its prior stated goal to know if U is eligible | system confirmed to u1 that system 231 knows that u1 is eligible for the covid vaccine [ACT] |

FIG. 6N

| UTTERANCE | SYSTEM REASONING | PLAN ELEMENTS |
|---|---|---|
| U: Yes, please | S believes U wants S to do make appointment | |

FIG. 6P

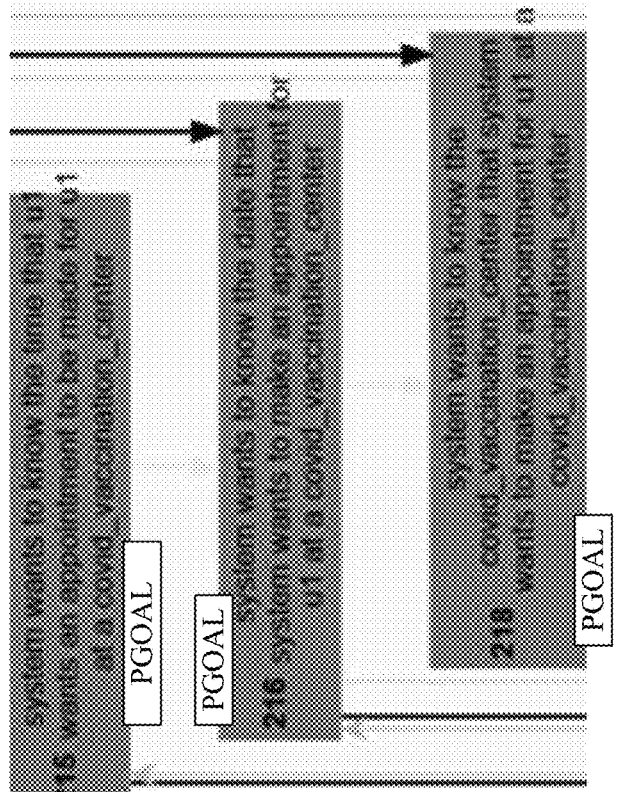

| UTTERANCE | SYSTEM REASONING | PLAN ELEMENTS |
|---|---|---|
| S: What date would you like the appointment? | S has goals to KNOWREF the date such that U wants S to make an appointment on that date. This "slot-filling" is performed by reasoning about knowledge. Note that the system has generated multiple goals at the same time for the various values that it needs. This is useful for when the user over-answers a question. . | |

FIG. 6Q

| UTTERANCE | SYSTEM REASONING | PLAN ELEMENTS |
|---|---|---|
| S: Would you like me to make you an appointment at CVS covid vaccination center at 9am? | S always confirms actions that it does for U's benefit. This request for confirmation is for a more specific intended action (now binding in the intended time). In fact, Monday and CVS are also bound in but not confirmed because the time was the topic of conversation. | INTENTION 419 System intends to propose that system make an appointment for U at a covid_vaccination_center<br><br>ACT 442 System asked U whether U wants to make an appointment for U at a covid_vaccination_center at () |

FIG. 6T

| UTTERANCE | SYSTEM REASONING | PLAN ELEMENTS |
|---|---|---|
| U: Fine | U confirms that the proposed time is acceptable (i.e., U wants to have an appointment at that time) | |

FIG. 6U

| UTTERANCE | SYSTEM REASONING | PLAN ELEMENTS |
|---|---|---|
| S: *Making an appointment at CVS covid vaccination center on Monday at 9 am* | S has inferred via equality reasoning that the vaccination center (VC) at which U wants the appointment (CVS) is the VC where U wants to be vaccinated, which is the VC where U wants to go, which is the VC that is 6 miles away and has covid vaccine. | system intends to make an appointment for u1 at cvs covid_vaccination_center at 9 [INTENTION]<br><br>system got system to make an appointment at cvs covid_vaccination_center for u1 for monday at 9 [ACT]<br><br>system confirmed to u1 that u1 has an appointment at cvs covid_vaccination_center [ACT]<br><br>u1 believes that system got system to make an appointment at cvs covid_vaccination_center for u1 for monday at 9 [BELIEF]<br><br>u1 believes that u1 has an appointment at cvs covid_vaccination_center [BELIEF] |

FIG. 6V

COLLABORATIVE PLAN-BASED DIALOGUE SYSTEM AND METHOD

CROSS-REFERENCE TO RELATED APPLICATIONS

The present application claims priority to and the benefit of U.S. Provisional Patent Application Ser. No. 63/435,643, filed Dec. 28, 2022, and is related to U.S. Patent Application Publication No. 2022/0392454 A1, published on Dec. 8, 2022, and having an application Ser. No. 17/341,804 and filed on Jun. 8, 2021, the contents of which are herein incorporated by reference as if set forth herein in its entirety.

BACKGROUND

Current dialogue systems are frame-based or task-oriented systems. These systems have very limited goals in service of which the system performs actions such as book movie tickets, and make restaurant reservations. The system determines which action(s) in its repertoire the user is requesting, and prompts the user to provide values for the "slots" (i.e., parameters) in the desired action frame, where an action frame includes one or more parameters associated with the action. The one or more parameters may be associated with an intent. Natural Language Processing (NLP) techniques are useful for performing action/intent classification to determine which action is being requested, and slot-filling. Such systems prompt a user for missing slot values (e.g., the date & time, number of people, etc.) Users need to supply one or more atomic values to fill those slots, such as "Monday at 7 pm," where an atomic value is a value that is not defined in terms of something else, such as a function, predicate, or variable. The system learns optimal slot-filling dialogue policies from data, but only for simple atomic slot values. In typical systems, slots can only process atomic values and cannot process constraints.

Typical plan-based approaches to dialogue that were based on analyses of speech acts, synonymously dialogue acts, such as requesting, informing, confirming, suggesting, etc., had many technical limitations, especially the lack of a proper semantics and inference mechanism for the mental state expressions. Some prior approaches represented plans as a complex of mental state expressions, but only used belief and desire without offering any semantics to these terms, thus the expressions and inferences were not properly meaningful or constrained. Thus, the system's operation was not directly tied to the behavior specified by the formulae that it attributed to itself and to others. In other words, the formulae did not have operational semantics. Other prior works, such as current frame-based or task-oriented dialogue systems have no guiding formal semantics to their notions of intent and slot, so we do not know what their internal states mean. Furthermore, they have misused the terminology of intent to assume that the content of an utterance refers to an intended action, which it need not.

SUMMARY

Described herein is a multimodal collaborative conversational dialogue system include a multimodal avatar interface and one or more sensors, which obtains one or more multimodal inputs. A multimodal semantic parser generates one or more logical form representations based on the one or more multimodal inputs. A collaborative dialogue manager infers a goal of the user from the one or more logical form representations, and develops a plan including communicative actions and non-communicative actions with regard to the goal. The multimodal avatar interface outputs one or more multimodal collaborative plan-based dialogue system-generated communications with respect to execution of at least one communicative action. The collaborative dialogue manager maintains a collaborative dialogue with the user until obtainment of the goal.

BRIEF DESCRIPTION OF DRAWINGS

The various embodiments of the disclosure will hereinafter be described in conjunction with the appended drawings, provided to illustrate, and not to limit, the disclosure, wherein like designations denote like elements, and in which:

FIG. 4 is an example of slot-filling question in accordance with embodiments of this disclosure.

DETAILED DESCRIPTION

Figure 1:
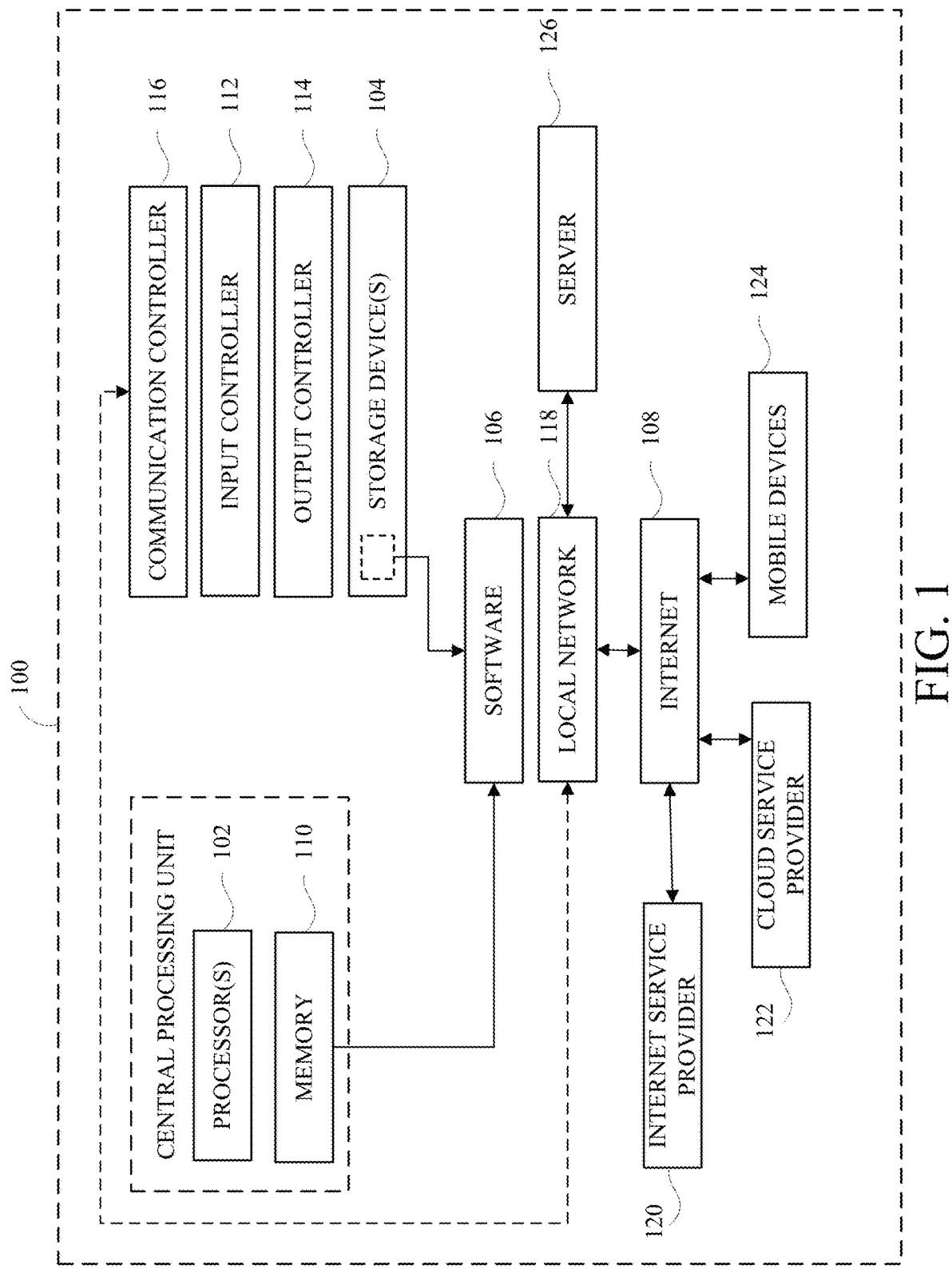
FIG. 1 is a block diagram of an example of a computing device in accordance with the embodiments of this disclosure.

Described herein is a fully functional neuro-symbolic domain-independent commercial dialogue system and/or a collaborative plan-based dialogue system that takes seriously the tenet that the purpose of dialogue is to affect the interlocutors' mental states. In implementations, the system can be implemented as a virtual assistant system. The system attempts to collaborate with its users by inferring and debugging their plans, and then planning to overcome obstacles to achieving their higher-level goals. This process enables the system to help users in the event of unanticipated failures, and to address the user's intended goals rather than just to answer literally. Because the system is a plan-based dialogue system, the system can explain its actions upon request, and can use its plan to tell users proactively the reason for the system's upcoming actions thereby contributing to more trustworthy interactions. The system employs declarative, collaborative, explanatory belief-desire-intention (BDI) reasoning and planning for general task-oriented dialogue.

The system can express and reason with beliefs, goals, and intentions and their interactions. In order to engage in dialogues, the system plans to satisfy its goals and intentions, subject to its beliefs and those it ascribes to its interlocutors. In doing so, the system employs a rich user model based on its theory of the interlocutors' minds. The planning and reasoning subsystems obey the principles of persistent goals and intentions as described in Cohen, P. R. and Levesque, H. J., Intention is choice with commitment, *Artificial Intelligence* 42 (2-3), 1990a, 213-261 (hereinafter "CL90"), which is incorporated herein by reference as if set forth herein, including the formation and decomposition of intentions to achieve complex actions, as well as the conditions under which they can be given up. Among those actions are speech acts, which are for example defined in Cohen, P. R. and Perrault, C. R., Elements of a plan-based theory of speech acts, *Cognitive Science*, 3 (3), 1979, which is incorporated herein by reference as if set forth herein, Cohen, P. R., and Levesque, H. J., Rational Interaction as the Basis for Communication, *Intentions in Communication*, Cohen, P. R., Morgan, J. and Pollack, M. E., MIT Press, 1990b (Cohen and Levesque, 1990b) (hereinafter "CL90"), which is incorporated herein by reference as if set forth herein, and other papers. The system plans its speech acts just like it plans its other actions. Likewise, it infers how its interlocutors' speech acts fit into their plans, and then attempts to debug and further those plans.

The collaborative plan-based dialogue system is able to combine information from a representation of domain and communicative actions, a representation of the world and of its interlocutors' mental states, and a set of planning and plan recognition algorithms, in order to achieve its communicative goals. It does so by reasoning about how speech acts can be used to achieve its own and its user's goals and intentions, and how those goals and intentions fit into higher-level plans. The collaborative plan-based dialogue system will plan its actions in order to enable its users' goals to succeed. Importantly, the system knows how to engage in dialogue generally, and can apply its planning processes to any domain whose actions and predicates have been described in its knowledge representation language. The system, thus, has to acquire a description of the domain actions or business processes.

Because of the system's generativity, it differs from systems that employ a hierarchical script of utterances, flow charts, or finite state set of dialogue states, for which the developer needs to anticipate every possible input and output. Instead, the system reasons at run-time how the user's utterances are part of the user's plans and goals, and plans how it should respond to further them. Thus, the system itself decides what to say, not the developer. In order to do so, the system's behavior is grounded in theories of speech acts, belief/desire/intention logics and teamwork that prescribe the kinds of behavior such a system ought to exhibit.

It has long been argued that task-oriented dialogue is a special case of collaborative plan-based behavior in which the participants jointly attempt to achieve the user's goals by performing communicative (and non-communicative) actions. Here, communicative actions are actions by one participant that are presented or communicated to the other participant, and non-communicative actions are actions that are internally performed by one participant but are not presented to the other participant. That is, the system executes a predefined set of actions without conveying information to the users of the system. Whereas physical actions are planned to alter the physical world, communicative acts are planned to alter the (joint) mental and social states of the interlocutors, i.e., the participants in the dialogue. Though the plan-based approach to dialogue is an attractive theory that has received many years of research, few full-scale implementations have taken place that incorporate all the components needed to create a system that can engage in useful collaborative dialogues in the form of the collaborative plan-based dialogue system described herein. Although it is not necessary to build a dialogue system whose internal state is declaratively specified as logical expressions, indeed most of the current dialogue literature eschews such an approach, by doing so we provide an expressive basis for a reasoning system, as well as a formal semantics for the system's internal states and its conclusions, such that we and the system itself are able to explain its inner workings. In other words, the system's state is not merely latent, but transparent.

The collaborative plan-based approach detailed here is quite different from approaches in present research or commercial dialogue systems, and even plan-based approaches of the past. Essentially, rather than just populate a system "belief state" made up of so-called "intents" with "slots" and "values" as present conversational systems do, the collaborative plan-based dialogue system has a far more expressive representation of beliefs, goals, and intentions that drive the collaborative planning and plan recognition system. Furthermore, the same reasoning mechanism supports multi-agent (person or bot) dialogues. In doing so, the system incorporates a rich domain knowledge representation that describes its domain of discourse.

The collaborative plan-based dialogue system described herein provides various collaborative dialogue capabilities. For example, current generation "intent+slot" systems have great difficulty with the user's answering a slot-filling question (e.g., "what time do you want the reservation?" with a statement of a constraint ("not before 11 am"). Furthermore, such "intent+slot" systems assume that it is the user who fills slots. In contrast, the collaborative plan-based dialogue system can propose potential slot fillers ("would you like 9 am?"), to which a user may then accept, reject, or negotiate. The parties have together or collaboratively filled the slot, not just one of them. The collaborative plan-based dialogue system implements this reasoning with a Horn-clause interpreter (Prolog), which enables computable inference within its subset of logic. Many researchers have thought the logic of intention to be too complex to implement and to support a dialogue system. However, the collaborative plan-based dialogue system operates in real-time using spoken language and drives a complex avatar as an interface for the collaborative plan-based dialogue system.

For purposes of illustration, an example dialogue is presented in Table 1. The table also provides annotations of each dialogue turn.

TABLE 1

| Number | | |
|---|---|---|
| 1. | U: Are there any covid vaccination centers nearby? | U issues an indirect speech act. Eva infers that the user does not simply want to know whether a vaccine center exists, s/he wants to know which it is (are). The system engages in further plan recognition, inferring that the user wants to go there in order to be vaccinated. |
| 2. | S: Yes, CVS is a covid vaccination center located at 130 Main street 6 miles away from you via route: [turn left, turn right, go straight, . . .] | S answers the literal question, then responds to what it believes the user really intended, telling the user what it believes she needs to know (the route). |

TABLE 1-continued

| Number | | |
|---|---|---|
| 3. | S to CVS: Do you have covid vaccine available? | Because the vaccine center's having vaccine is a necessary condition for the success of the user's plans, the system needs to know whether that condition holds. So, it plans a question to find out the answer from the vaccine center, whom it believes knows the answer. |
| 4. | CVS to S: Yes | The system trusts the vaccine center so it believes what the vaccine center says. |
| 5. | S to U: CVS has covid vaccine. | S confirms the necessary condition to the user. |
| 6. | S: How old are you? | A precondition of being vaccinated is that the user is eligible for the vaccine. The system's question is planned based on the rules defining eligibility. |
| 7. | U: why do you ask? | User asks for an explanation of question 6). |
| 8. | S: The reason is that I need to determine whether you are eligible for the Covid vaccine | System examines the plan it has created that led to the question, providing the goal from which it derived the goal to know the user's age . . . |
| 9. | S to U: Sorry to have to ask again, but how old are you? | S brings conversation back to a goal that it has been pursuing. |
| 10. | U: 55 years old | |
| 11. | S: Are you caring for someone who is disabled? | A criterion for vaccine eligibility for someone who is 55 years old. |
| 12. | U: Yes | |
| 13. | S: OK, you are eligible to receive a covid vaccine | |
| 14. | S: Would you like me to make an appointment at a covid vaccination center? | The system asks whether the user wants it to do the action of making an appointment because the action benefits the user and achieves a precondition for being vaccinated. |
| 15. | U: Yes, please | |
| 16. | S: What date would you like the appointment? | S plans a 'slot-filling' question based on reasoning about the arguments to an intended action and a user model that states that by default, the user knows the date when she wants an appointment. |
| 17. | U: Monday, the earliest time available | The user "over answers", providing information that was not yet requested. S's response expresses a constraint as a complex logical form (superlative). User does not fill the slot. |
| 18. | S: The earliest available time is 9 am | System tells user what user needs to know |
| 19. | S: Would you like me to make you an appointment at CVS covid vaccination center at 9 am? | S again asks for permission, proposing a time |
| 20. | U: Fine | U accepts the proposed time |
| 21. | S: OK, making an appointment at CVS covid vaccination center on Monday at 9 am | S does the action and confirms it. |

In the example dialogue, the collaborative plan-based dialogue system can plan its actions to achieve its goals, can infer the goals and intentions that the user likely has, can plan to assist the user by proactively informing what it believes the user needs to know (e.g., the route), can explain its actions, can reason about who knows the answers to its knowledge acquisition goals (e.g., CVS) and to ask that party a question. The collaborative plan-based dialogue system can also handle complex constraints ("the earliest time available"), rather than just atomic "slot-fillers", and can reason with domain rules (e.g., a person who is less than 65 years old is eligible for the covid vaccine if that person is caring for a disabled individual), leading it to generate new knowledge acquisition goals.

Described herein is the collaborative plan-based dialogue system (hereinafter "system") architecture, including its essential representations, basic operating loop, embodiment as an avatar, and logical form meaning representations. The formalism, including the base Horn clause logic, the modal operators, and the action representation are described. Also described is how the system's Horn clause modal logic meta-interpreters can reason about and maintain the system's rational balance among its "mental states." Given this machinery, there is a description of how speech acts are represented as planning operators, illustrated with three types of questioning speech acts along with requests. The description then describes how collaboration is implemented, especially its reliance on planning and plan recognition.

The system is driven by its own beliefs (self-beliefs) and beliefs about its user's goals and intentions, so it is important to know where goals come from. In particular, it is described how epistemic goals arise during the course of planning, including how these epistemic goals and model of the user's mental states underlie the system "slot-filling" capabilities. The BDI architecture is described, which reasons with these mental state formulas to form plans of action with both domain and communicative actions. This architecture is shown to have an operational semantics based on the specification of rational interaction. Based on these descriptions, a detailed example shows how the system handles complex multi-turn dialogues in a domain-independent way. In particular, how the system handles requests for explanation during the dialogue—"why did you say that?".

FIG. 1 is a block diagram of a system that comprises a computing device 100 to which the present disclosure may be applied according to an embodiment of the present disclosure. The system includes at least one processor 102, designed to process instructions, for example computer readable instructions (i.e., code) stored on a storage device 104. By processing instructions, processor 102 may perform the steps and functions disclosed herein. Storage device 104 may be any type of storage device, for example, but not limited to an optical storage device, a magnetic storage device, a solid-state storage device, or a non-transitory storage device. The storage device 104 may contain software 106 which may include a set of instructions (i.e., code). Alternatively, instructions may be stored in one or more remote storage devices, for example storage devices accessed over a network or the internet 108. The computing device 100 also includes an operating system and microinstruction code. The various processes and functions described herein may either be part of the microinstruction code, part of the program, or a combination thereof, which is executed via the operating system. Computing device 100 additionally may have memory 110, an input controller 112, and an output controller 114 and communication controller 116. A bus (not shown) may operatively couple components of computing device 100, including processor 102, memory 110, storage device 104, input controller 112, output controller 114, and any other devices (e.g., network controllers, sound controllers, etc.). Output controller 114 may be operatively coupled (e.g., via a wired or wireless connection) to a display device such that output controller 114 is configured to transform the display on display device (e.g., in response to modules executed). Examples of a display device include, and are not limited to a monitor, television, mobile device screen, or touch-display. Input controller 112 may be operatively coupled via a wired or wireless connection to an input device such as a mouse, keyboard, touch pad, scanner, scroll-ball, or touch-display, for example. An input device (not shown) is configured to receive input from a user and transmit the received input to the computing device 100 vial the input controller 112. The input may be provided by the user through a multimodal interface-based computer-implemented tool. These inputs are, but not limited to, images, speech, audio, text, facial expressions, body language, touch, scanned object, and video. The communication controller 116 is coupled to a bus (not shown) and provides a two-way coupling through a network link to the internet 108 that is connected to a local network 118 and operated by an internet service provider (ISP) 120 which provides data communication services to the internet 108. A network link may provide data communication through one or more networks to other data devices. For example, a network link may provide a connection through local network 218 to a host computer, to data equipment operated by the ISP 120. A cloud service provider 122 and mobile devices 124 provides data store and transfer services to other devices through internet 108. A server 126 may transmit a requested code for an application through internet 108, ISP 120, local network 118 and communication controller 116. FIG. 1 illustrates computing device 200 with all components as separate devices for ease of identification only. Each of the components shown in FIG. 1 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 100 may be implemented as one or more servers, for example a farm of networked servers, a clustered server environment, or a cloud network of computing devices.

Figure 2:
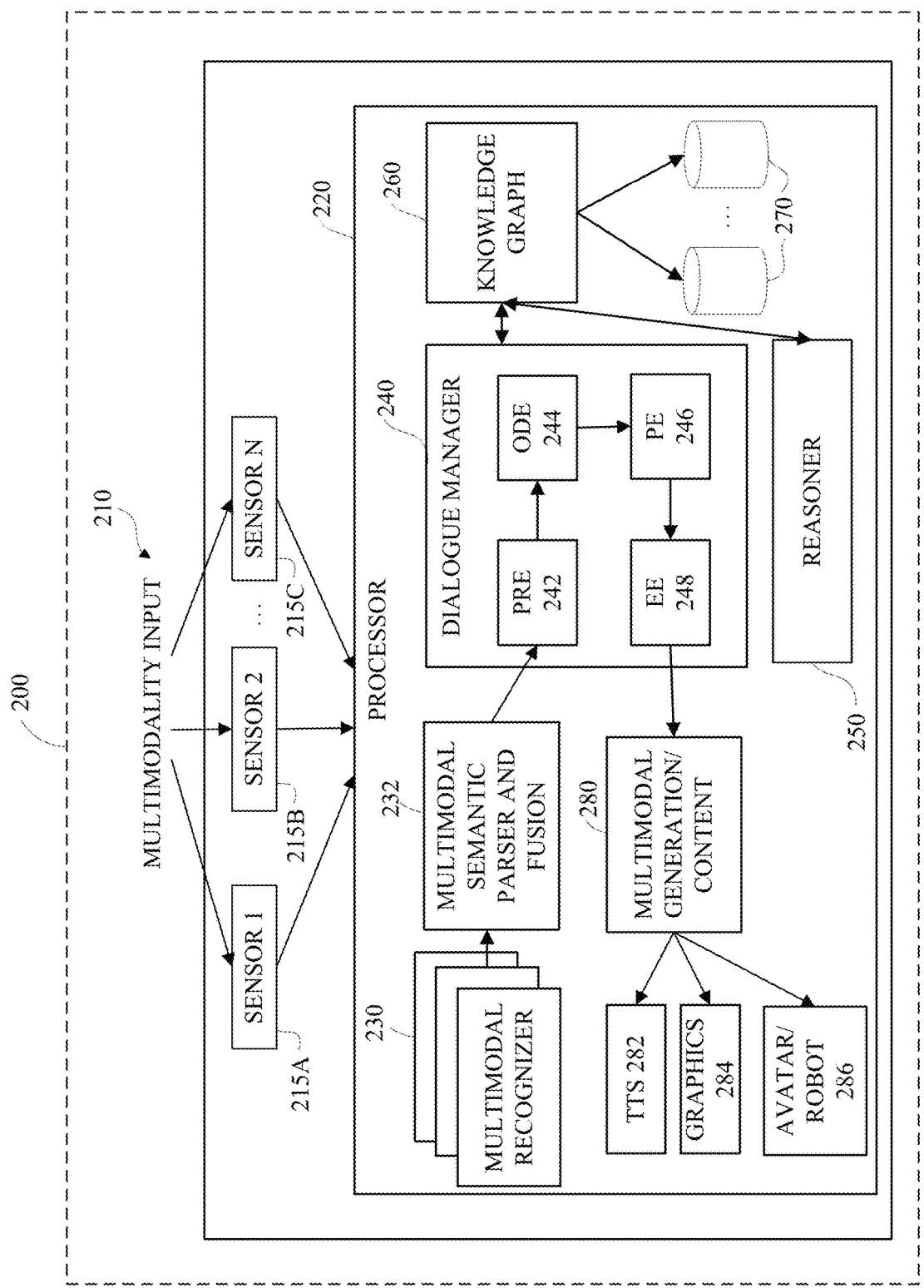
FIG. 2 is a block diagram of an example system in accordance with embodiments of this disclosure.

FIG. 2 is a block diagram of an example system 200 for collaborative plan-based dialogue management in accordance with embodiments of this disclosure. User dialogue can be in the form of multimodality input 210, which can be obtained from one or more sensors, such as sensors 215A-215C. The multimodality input 210 can include, but is not limited to, utterances, speech, text, touch-based input, gestures, facial expressions, audio, video, body language, visual, body postures, eye gaze, lip reading, and/or other modalities. The user dialogue is processed by a processor 220 and the components described therein. The user dialogue is fed to multimodal recognizers 230. The multimodal recognizers 230 may include one or more recognizers such as, but not limited to, an automatic speech recognizer (ASR), a gesture recognizer, a facial recognizer, and other multimodal recognizers. The outputs from these recognizers are input to a multimodal semantic parser and fusion processor 232 for semantic parsing and fusion of multimodal elements, to discover beliefs, intents, emotions, and the like, of the user. For example, the multimodal semantic parser and fusion 224 may receive the input speech and other modalities (e.g., gesture, sketch, touch, vision, etc.) from the multimodal recognizer 230, parse them into logical form meaning representations and fuse their meanings into logical forms (LFs) that incorporate one or more speech acts. The multimodal semantic parser and fusion 224 may output the LFs to a dialogue manager 240. Using the same representation of speech acts for planning and plan recognition, the LF is input to a plan recognition process that attempts to infer why the user said/did what was observed. Once a user's plan is derived, the system adopts the user's goals as its own if they do not conflict with its other goals and obligations. The system then collaborates by attempting to find obstacles to the plan, which it plans to overcome in order to help the user achieve their higher-level goals, resulting in intended actions. Afterwards, it executes (some of) those intended actions, which may well involve communicating with the user, generating linguistic and multimodal output, including text-to-speech, graphics, and avatar behavior. In the course of this processing, the system may access backend databases and commercial systems to gather and/or update required information and take needed actions.

The dialogue manager 240 is a core component of the disclosed collaborative plan-based dialogue management. The dialogue manager 240 includes a plan recognition engine (PRE) 242, an obstacle detection and goal adoption engine (ODE) 244, a planning engine (PE) 246, and an execution engine (EE) 248. The dialogue manager 240 works with a reasoner 250 to derive and attribute new mental states to the user as the collaborative dialogue progresses.

As further described herein, the dialogue manager 240 is configured to generate a plurality of plans via the PRE 242, determine the user plans via the PRE 242, detect the regions of those plans (i.e., both system generated and user plans) that form obstacles via the ODE 244, identifies the alternative plans in the case of obstacles via the PE 246, and execute one or more of those plans via the EE 248, as well as identifying and/or updating the context among the sequence of dialogues presented to the system 200. The dialogue manager 240 interacts with knowledge sources and the obtained knowledge is modeled in a local database, a remote database, or in the form of a local or remote knowledge base or graph 260. The knowledge base 260 comprises multimodal dialogue state information such as (mutual) beliefs, goals, action definitions, preferences, (individual or joint) intentions, obligations, expectations, defaults, rules, context, domain knowledge, common sense knowledge, personal knowledge, data, and/or the like. The dialogue manager 240 also interacts with external knowledge sources and applications 270 such as Yelp, OpenStreetMaps, or the like, to determine/discover facts to be used or conveyed. Based on the actions of plan execution, the dialogue manager 240 generates a response to the multimodal inputs of the user by producing multimodal generation or content 280 that is rendered by one or more presentation tools like Text-To-Speech (TTS) 282, a graphic or display 284, an avatar or robot 286, or the like. The dialogue manager 240 also controls the overall dialogue flow.

In practice, exemplary systems described herein such as systems 100 and 200 can include additional system components, additional relationships between system components, and the like. The relationships shown between modules within exemplary systems described herein such as system 100 and 200 indicate general flows of information in the respective system; other relationships are not shown for the sake of simplicity. Depending on the implementation and the type of processing desired, modules of the system can be added, omitted, split into multiple modules, combined with other modules, and/or replaced with like modules. Generally, the technologies described herein are generic to different operating systems or hardware and can be applied in any variety of environments to take advantage of the described features.

For many current task-oriented dialogue systems, the meaning representation is simply an "intent+slot" representation of an action and its arguments that, it is assumed, the system is being requested to perform. However, this is too simplistic a meaning representation to support expressive dialogues. The system's LF meaning representation involves more complex formulas that express both the speech actions that the parties are doing as well as the content of their utterances, which not only includes domain actions to perform, but also complex operator combinations (e.g., comparatives, superlatives, Boolean combinations, temporal constraints, etc.), and operators over actions (e.g., "quitting smoking," "permitting to be interviewed"). A comparison of the slot-filling approach to dialogue with the collaborative plan-based approach that incorporates true logical forms is described herein later below. The system maps utterances into the "surface speech act", from which it can infer the intended meaning of indirect speech acts.

The system employs a deeply learned neural sequence-to-sequence semantic parser (multimodal semantic parser and fusion processor 224) whose encoder is a pre-trained language model XLM-RoBERTa (multi-lingual Robust BERT) that is fine-tuned on pairs of utterances and logical form (LF) meaning representations. The multimodal semantic parser and fusion 224 returns an LF representation that incorporates both the surface speech act as well as its propositional content. These LFs are then input to the plan recognition component (the dialogue manager 240 and reasoner 250) that starts reasoning about the user's speech act(s) and what s/he was trying to achieve in performing them. The training of the multimodal semantic parser and fusion 224 is begun with "canonical" utterances generated from logical forms that are derived from a backend application. These canonical utterances are then paraphrased into natural language, using both machine resources and crowdsourcing. Because the system makes use of a large-scale multi-lingual language model (XLM-RoBERTa) during the parsing process, when building the system to be used in a language other than English, a relatively small amount of human-generated paraphrases of the canonical utterances can be gathered in that language and added to the training data.

Natural language generation uses a hierarchical generator driven off the logical form structure that creates "canonical" utterances, which are then paraphrased using large language models (LMs) to produce realistic natural language. These canonical utterances can also be provided to crowd workers in order to generate human paraphrases. Large language models are not used by themselves as generators because they are not sensitive to what the system is intending to convey, potentially resulting in inappropriate or untruthful utterances at that stage of the dialogue. In addition, a generator needs to decide such issues as when to issue a pronoun, how to refer to entities, when to issue discourse markers, etc. Being able to get paraphrases from large-scale language models does not provide solutions to such problems. However, for the purposes of the system, the multimodal semantic parser and fusion 224 can provide a proper logical form, and a generator can produce natural language from that logical form.

Figure 3:
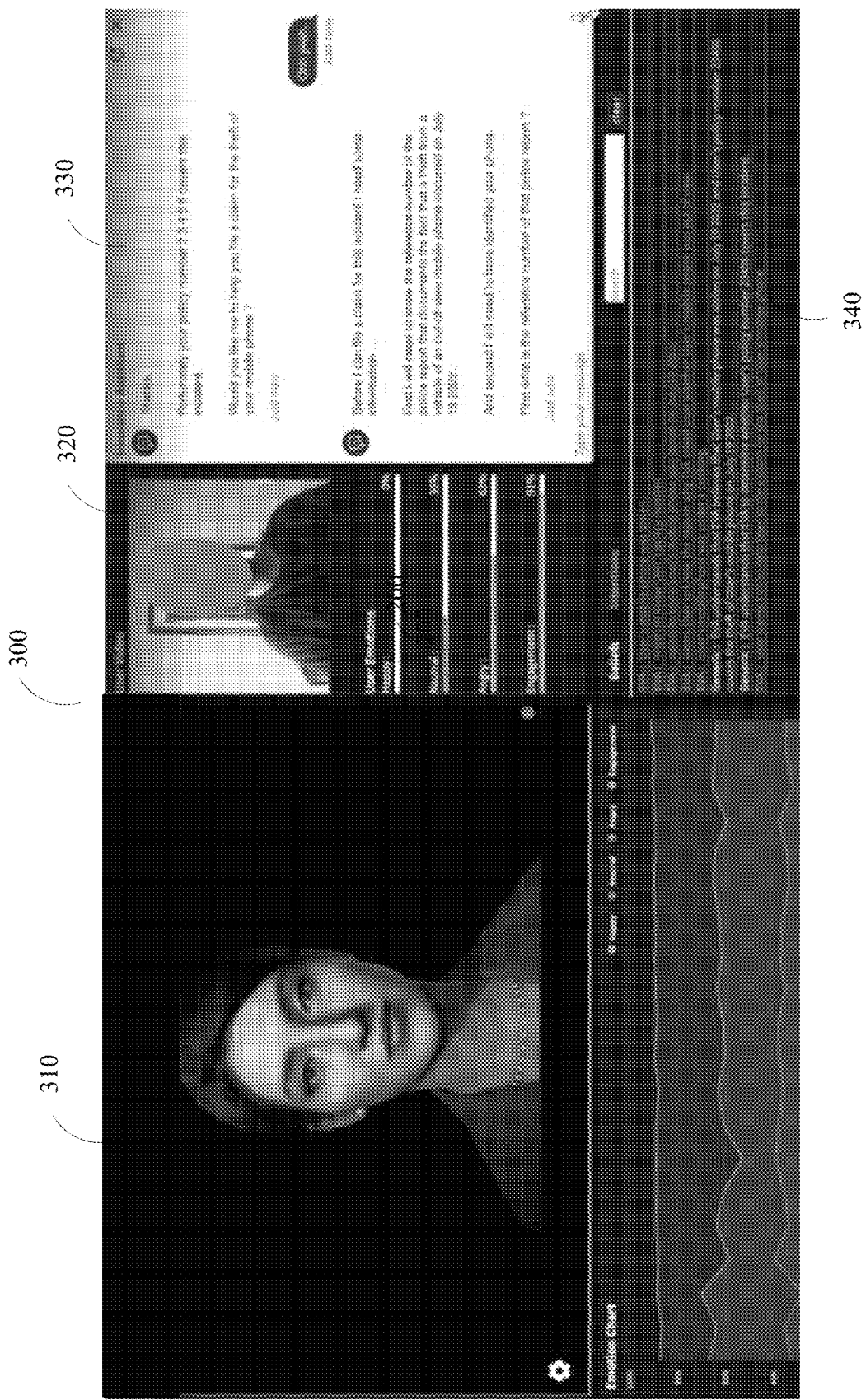
FIG. 3 is a virtual assistant or avatar interface for use with the system in accordance with embodiments of this disclosure.

Described herein are the multimodal inputs and outputs. FIG. 3 is a virtual assistant or multimodal avatar interface 300 for use with the system. The multimodal avatar interface 300 includes an avatar 310, vision-based emotion recognition or recognizer 320, dialogue 330, and a snapshot of the system's beliefs, goals, and intentions 340. The multimodal avatar interface 300 accepts spoken language, camera-based input, and text, and produces spoken, textual, GUI, and face/head gestures as output. The system tracks various emotional states and engagement in real-time, enabling it to generate responses to the user's signaled states, using its model of the user's beliefs and intentions. Conversely, the system can generate facial gestures and rapport-building utterances to signal various emotional states, such as sadness. The cues for what emotions (visual and via text-to-speech) are based on the words being generated, as well as the logical forms generated in context. As an example, consider if the system asked the user "was there a reaction to that vaccination?" and the user said, "Yes." The system can generate an empathic utterance (e.g., "that's awful"), even though the user issued a "positive" or "neutral" utterance.

Described herein is the knowledge representation and inference used by the system. The knowledge representation is encoded as modal logic formulas describing the system's and the users' beliefs, goals, and intentions. The reason for encoding the system's knowledge in a logic is that it affords more expressive representations that are required for engaging in substantive dialogues about tasks. Examples of the kinds of representations the system maintains and its associated reasoning is described herein. The tools described herein enable the system to engage in expressive dialogues, not to focus on logic and reasoning per se.

Described herein is the formalism and its semantics. The system uses a Horn clause first-order modal logic, with constants, variables, typed terms, n-ary predicates, conjunctions, disjunctions, negation of literals, and existential quantification. In addition, second-order predicates, such as superlatives, set operators, etc are included. Predicates and actions take a list of arguments, with each argument specified by a role name, a variable, and a type drawn from an ontology. Syntactically, the adopts the use of Prolog convention of signifying variables with capital letters. Thus, an argument list will be of the form: [Role:Variable #Term . . . ]. From here on, assume all arguments presented have this form, though we will only typically specify the Variable. The system's knowledge representation incorporates a belief operator (bel), along with two operators defined in terms of bel, for knowing whether a formula holds (knowif) and knowing the referent of a description (knowref). Likewise, the system incorporates persistent goal (pgoal) and intend as modal operators, with pgoal taking a formula as an argument, and intend taking an action expression. Each of these takes a probability argument. Predicates over action expressions include: Do, Doing, Done. The system allows specific times to be arguments and have special "before" and "after" operators that apply to them. The system takes advantage of basic Horn clause reasoning (as in Prolog), and incorporates two meta-interpreters for forward ('→') and backward ('←') modal logic reasoning, which are used to assert and to prove formulas, respectively. Prolog incorporates the not-provable operator '\+', and does not unify operator '\=', both of which are used in the meta-interpreter. The full syntax of the language is described herein below. The Prolog convention is followed such that elements of formulas beginning with capital letters are variables, which have a Type that is drawn from an ontology. Note that this use of the term 'role' is derived from natural language processing, as opposed to the planning literature.

Described herein are mental state modal operators. The attitude modalities employed are Belief (bel), Persistent Goal (pgoal), and intending to perform actions (intend), along with two defined operators, Knowif and Knowref.

Described herein is Belief. The system uses a Kripke-style possible worlds semantics of belief, such that propositions that an agent believes are true in all possible worlds that are related to the given one (the world the agent thinks s/he is in). Thus, for a well-formed formula P we say:

bel(X, P). P follows from agent X's beliefs,

If P is true in some of X's belief-related worlds, but not in all of them, then the agent neither believes P nor believes ~P.

For example, we will want to be able to state such formulas such as (after utterance 17 in the example dialogue) that the user believes that the system wants to find out the date that user wants the system to make an appointment for the user. As shown, there are multiple embeddings of modal operators in such a formula. The description below shows how such formulas can easily be expressed. The syntax and formal semantics of belief is stated in terms of a possible worlds analysis (as further described herein).

Notice that, if needed, the system tries its best to prove the proposition P given the rest of the agent's beliefs, but if it cannot, that does not mean that it believes P is false; the system simply cannot prove it.

Described herein is goal. The model of goals is that goals encode agents' choices. This is modeled in a possible worlds semantics by having goal formulas be true in all of the agent's chosen worlds. Among the worlds compatible with the agent's beliefs are all the ones compatible with the agent's goals (choices). In other words, the chosen worlds are a subset of the worlds consistent with the agent's beliefs. That does not mean that if the agent has P as a goal, it believes P is true. Instead, we require the converse—if the agent believes formula P is true, it is true in all belief-compatible worlds, so it is true in all chosen worlds, which are a subset of the belief compatible ones. The agent must choose what it believes to be true "now."

Syntax: goal(X, P)—P is true in all of X's chosen worlds. Because of the way formulas are evaluated in terms of a world and time, P is true in the chosen world at the time of evaluation.

The goal modal operator also has a positive introspection property—if the agent has a goal that P, it has a goal that it has the goal that P, and conversely. However, as with belief, we do not have a negative introspection property of goal itself. On the other hand, if the agent has the goal that P, it believes it has the goal that P and vice-versa. Finally, based on the semantics described herein below, an agent cannot have as a goal a formula that it believes to be impossible (the agent believes it will never be true.).

Described herein are defined modal operators. A critical aspect of a system that reasons about its users' mental states is that it can only have an incomplete model of them. Specifically, the system needs to be able to represent that the user "knows whether or not" a proposition is true, without its knowing what the user believes to be the case. For example, we might model that the user knows whether or not her car is driveable. Likewise, the system needs to represent that the user knows the value of a function or description, without knowing what the user thinks that value is. For example, the user knows his/her birthdate, social security number, etc. Because the system does not use a modal operator for knowledge, the concepts are defined in terms of belief below. Whereas a number of recent epistemic planning systems incorporate a knowif operator, as applied to propositional, formulas, none of them incorporate a modal logic knowref operator as applied to first-order formulas and their arguments.

Described herein is knowif. Given the modal operator for belief, we can define operators that capture incomplete knowledge about another agent's beliefs. Specifically, we define an agent's "knows-whether" or "knows if" a formula P as $$knowif(X, P) =_{def} bel(X, P) \vee bel(X, \sim P)$$

For example, in the sample dialogue, the system believes the user knows whether or not the user is caring for someone who is disabled.

An agent X's knowing whether or not P is true is defined as either X believes P is true, or X believes P is false. Notice that this is different between X's believing P or ~P holds, which is a tautology. One agent X can believe that another agent Y knows whether or not P holds without X's knowing what Y in fact believes. However, X believes Y is not undecided about the truth of P.

Described herein is knowref. An agent X's knowing the referent of a description is defined as:

knowref (X, Var^Pred)=$_{def}$ ∃Var bel(X, Pred), where "^" means "such that", and where Var occurs in Pred.

The semantics for quantifying into beliefs and goals/pgoals is described herein below. Essentially, there is some entity of which the agent believes it has the property Pred. Semantically, a value is assigned to the variable Var, and it remains the same in all of the agent's belief-compatible worlds. For example, the system may believe that X knows the referent of X's social security number, without the system's knowing what that is. Notice that this is different than the system's believing X believes X has a social security number, for which the existential quantifier is within the scope of X's belief. It is shown below that the overriding concern of the present task-oriented dialogue literature involving "slot-filling" is better modeled with goals to knowref.

Described herein is persistent goal. A critically important modal operator that is key to the representation of intention is persistent goal (pgoal). The idea is that simple goals can be ephemeral, so one cannot count on a goal as having any consequences on an agent's future actions. For this reason, the concept of persistent goal captures a notion of internal commitment (the formal semantics are described herein below). It is typically assumed that the phrases "want" and "need" will be translated into pgoal in the logical forms.

Syntax: pgoal(X, P, Q)—Agent X has a persistent goal to bring about the state of affairs satisfying formula P, relative to formula Q is defined as:

$$pgoal(X, P, Q) =_{def} goal(X, \Diamond P) \land \sim bel(X, P) \land$$
$$before(bel(X, P) \lor bel(X, \Box \sim P) \lor \sim bel(X, Q)), \sim goal(X, \Diamond P))$$

An agent X has a persistent goal that P become true is defined as: X does not currently believe P to be true and has a goal that P eventually be true; X will not give up P as an achievement goal at least until it believes P to be true, impossible, or irrelevant. By 'irrelevant' we mean that some other condition Q, typically encoding the agent's reasons for adopting P, is no longer believed to be true. We frequently will relativize one persistent goal to another as part of planning. If the agent does not believe Q, it can drop the persistent goal. However, if none of these conditions hold, the agent will keep the persistent goal. Conditions exist under which having a persistent goal would lead to planning and intention formation. For example, in utterance 15 of the sample dialogue, the system asks the user if the user wants (has as a pgoal) that the system make an appointment for the user. When the user says "yes", the system adopts the persistent goal to make an appointment relative to the user's persistent goal that the system do so. If the system learns that the user no longer wants the system to make the appointment, the system can drop its persistent goal and any parts of the plan that depend on it. Otherwise, the system will keep that persistent goal and plan to achieve it.

Described herein is intention. Agent X's intending to perform action Act relative to formula Q is defined to be a persistent goal to achieve X's eventually having done Act.

Syntax: intend(X, Action, Q)=$_{def}$ pgoal(X, done(X, Action) Q).

In other words, X is committed to eventually having done the action Act relative to Q. An intention is thus a commitment to act in the future. Notice that intentions take action expressions as arguments and are relativized to other formulas, such as pgoals, other intentions, and beliefs. If a relativization condition is not believed to be true, the agent can drop the intention. It has been shown that this definition satisfies the desiderata for an analysis of intention. For example, in the sample dialogue at utterance 16, the system forms the intention to ask a wh-question relative to the persistent goal, and then does so. This notion of intention is different than the current (mis)use of the term "intent" in the "intent+slot" dialogue literature. The latter is basically taken to refer to an action that the user supposedly wants the system to perform, or occasionally, ordinary predicates. Instead, we treat intend as a modal operator, with a formal logic and semantics.

Described herein is to combine the basic formulas and operators described above into complex formulas.

First, described is how to express the system's persistent goal relative to R to come to know whether the user has a persistent goal to achieve P, relative to Q.

pgoal(sys, knowif(sys, pgoal(user, P, Q)), R)

Next, we express that the system has a pgoal, relative to R, to know the time such that the user has a pgoal (relative to Q) that Pred to be true of that time.

pgoal(sys, knowref(sys,Time^pgoal(user, Pred(Time), Q), R)

As the action expressions are developed below, the predicates will become more realistic.

Given these operators, we provide axioms that they need to satisfy. We assume all axioms of first-order logic. The system supports belief and goal reasoning with a KD4 semantics and axiom schema. Specifically, bel(X,P) and goal(X,P) mean P "follows X's beliefs/goals". '|=' means 'is satisfied in all worlds':

K: If P is a theorem, |=bel(X,P) and |=goal(X,P)—theorems are true in all worlds
|=bel(X,P $\supset$ Q) $\supset$ (bel(X,P) $\supset$ bel(X,Q))—agents can reason with their beliefs D: |=bel(X,P) $\supset \sim$(bel (X,$\sim$P))—agents' beliefs are consistent
|=goal(X,P) $\supset \sim$goal (X,$\sim$P)—agents' goals are consistent 4: |=bel(X,P) $\equiv$bel(X, bel(X, P))—positive belief introspection
|=goal(X,P) $\equiv$goal(X, goal(X,P))—positive goal introspection Realism: |=bel(X,P) $\supset$ goal(X, P)—agents' chosen worlds include what they believe to be currently true.

For this system, material implication ' $\supset$ ' is implemented using Prolog's Horn clause reasoning.

Described herein are defaults. The system operates with a collection of defaults, many of which are targeted at its user model and domain facts. The general default schema is, using Prolog operators '\='(not unifiable) and '\+'(not provable):

$$P \leftarrow default(P), P\backslash = \sim Q, \backslash + \sim P.$$

That is, P is true if P is stated as a default predicate, P is not the negation of a formula Q, and it cannot be proven that $\sim$P. If P is a default formula, but its negation can be proven, then P's is not true by default. These are among the normal defaults.

For example, we might have:
default(driveable([car_of(user)])—by default, the user's car is driveable.
default(knowif(user, damaged([mobile_phone (user)])))—by default, the user knows whether the user's phone is damaged.
default(knowif(user,pgoal(user,Pred,Q)))—by default, the user knows whether the user has a pgoal for Pred. That is, by default, the user knows whether she wants some predicate Pred.
default(knowif(user,knowref([user, Var^Pred])))—by default, the user knows whether the user knows the referent of Var^Pred.

The previous two defaults have schematic variables for the interesting formulas and variables (Pred and Var). When those are provided with actual formulas and variables, a specific default would be queried.

Described herein are actions. Of particular importance to a planning system is the representation of actions. Herein are action descriptions that incorporate both primitive and composite actions. Using an extended STRIPS-like description of actions, primitive actions are described using an action signature, which consists of the action name and a list of arguments, where each argument is of the form Role:Value #Type. The only requirement for an action is that there be an agent role and filler of type agent (which is a concept in the ontology). Tables 2 and 3 show an English gloss of the action expression for a vaccine center's vaccinating a patient at a location, date and time, and its internal representation, respectively.

TABLE 2

The action of a medical center's vaccinating a patient is described as:

Center vaccinates Patient for Disease
   Precondition: Patient has an appointment at Center at Date and Time
     Patient is located at Loc at Date/Time
   Constraint: Center is located at Loc
   Effect: Patient is vaccinated by Center with Vaccine
Applicability Condition: Center has Vaccine and Patient is eligible for Vaccine

TABLE 3 equivalence class: 1
[the X#covid_vaccination_center such that user wants to go from some place to a
   covid_vaccination_center]
[the X#covid_vaccination_center such that user intends to be vaccinated for
   covid at a covid_vaccination_center]
[the X#covid_vaccination_center such that u1 may want someone to vaccinate u1
   for covid at a covid_vaccination_center]
equivalence class: 2
[the X#time such that u1 wants someone to vaccinate u1 for covid]
[the Y#time such that u1 wants to go from some place to a covid_vaccination_center]
[the X#time such that u1 intends to be vaccinated for covid at a covid_vaccination_center]
[the Y#time such that u1 wants u1 to have an appointment at a covid_vaccination_center]
equivalence class: 3
[the X#date such that u1 wants u1 to have an appointment at a covid_vaccination_center]
[the X#date such that u1 intends to be vaccinated for covid at a covid_vaccination_center]
equivalence class: 4
[the X#location such that u1 wants u1 is currently located at u1 s home]
[the X#location such that u1 intends to go to a covid_vaccination_center nearby]

Actions have Preconditions, Effects, Applicability Conditions, and Constraints, which are well-formed formulas. The Precondition is that the Patient has an appointment at the proper Date and Time, and that the Patient is located at location Loc, which the Constraint stipulates to be the location of the vaccination center. The Effect states conditions that the agent wants (i.e., has as a pgoal) to be true at the end of the action. The Effect stated here is that the Patient is vaccinated by the Center.

Four functions are defined that operate over action expressions Action, providing the well-formed formulas P that are an action's precondition, effect, constraint, applicability condition:

precondition(Action, P)
effect(Action, P),
constraint(Action, P),
applicability_condition(Action, P)

Because the action description is just that, a description, rather than a modal operator, we do not need to struggle with the frame problem in order to plan sequences of actions. In particular, we do NOT say that after an action is performed, the Effect in fact holds, or that it holds conditioned on the precondition. Rather, if we observe that an action has been performed, we would infer that the agent wanted (i.e., had as pgoal) the effect stated in the action description. We will therefore refer to it as the desired or intended effect. Conversely, a planning agent may have a pgoal to achieve some proposition E (the desired effect). The planning subsystem will attempt to find an action expression whose Effect matches (unifies with) E. This is a more restricted relationship than logical entailment situation in that the system may not be able to prove theorems would entail E or unify with a conjunct within E. Thus, the system may not be able to find such a sequence of actions that ultimately entails E. However, that may not matter for a dialogue system, as we are not attempting to reason in advance about a long sequence of utterances during an interactive dialogue. Rather, the system attempts to take a step towards its goal and react to the inputs it receives, much as other BDI architectures do. In doing so, it may decompose effects that are conjunctions into individual plans to achieve the conjuncts.

If the agent has the pgoal that an Effect of some action A becomes true, it would add a pgoal to perform A (i.e., an intention to do A), and then to add its Precondition as a pgoal to the plan, if it does not believe the precondition holds. This backward-chaining may continue via effect-act-precondition reasoning. Finally, the Applicability Condition states formulas that must be true, but cannot be made true by the agent. For example, Table 2 shows the formal representation of the vaccination action. The Applicability Condition here is that the vaccine center has the vaccine and the Patient is eligible for the vaccine. If such Applicability Conditions are believed to be false (vs. not believed to be true), the agent believes the action A is impossible to achieve. Thus, the agent would not create a persistent goal or intention to perform action A because this violates the definition of persistent goal. Finally, the system may represent actions hierarchically as actions may optionally have a Body, which would be a decomposition into a complex action described with the dynamic logic operators below.

In addition to this description of the action, the system keeps track of the agent doing it. The action expression action(Agent1,Action, Constraint) indicates that agent Agent1 is doing Action. However, within the Action term itself, there is also an agent role (call it Agent). In most cases, the two agents are the same, but they need not be. By allowing for them to be different, we can represent that Agent1 does something to help or get Agent to perform the Action. An example might be submitting an insurance claim on behalf of someone else.

Notice that this action expression language is an extension of the hierarchical variants of the Planning Domain Definition Language (PDDL) such as HDDL. In particular, we add preconditions and effects on higher-level actions in addition to the primitives. Also of importance, the system allows action descriptions as arguments to other actions, supporting directive and commissive speech acts like requesting, recommending, etc.

Described herein are action description predicates. These predicates allow us to say that an action will be done in the future (do), is being executed (doing), or has occurred in the past (done). The system also provides explicit time arguments for these predicate for which it is simple to provide semantics for them using the logical tools:

do([Action, Location, Time)—Action will be done at location Location and Time in the future done([Action, Location, Time)])—Action has been done at Location and a past Time doing([Action, Location, Time)])—Action is on-going at Location and Time One additional predicate that is adopted is failed([Action, Reason]). The system uses this predicate when it sends an action invocation request to a backend system (e.g., asking a credit card validation system to validate a particular card number). If the backend system returns a failure, the Reason parameter encodes the cause of the failure, such as the card is invalid, over limit, etc. It can be text sent via the backend or a logical form. The system assumes that a failure means the action is impossible, so it drops that intention, though it may try to find another way to achieve the higher-level goal.

Described herein are complex actions combinators. Complex action descriptions are expressed with combinators drawn from dynamic logic, in addition to a combinator for hierarchical decomposition. This is shown in Table 4.

TABLE 4

| Compound Actions | Action Expressions | Example |
| --- | --- | --- |
| Sequential actions | seq(A, B) | seq(find_imei_number, informref) |
| Conditional Actions | condit(P, A) | condit(eligible(X), make_appt(X, vaccine)) |
| Non-deterministic Mutually Exclusive Or | disj(A, B) | disj(inform(S, U, P), inform(S, U, ~P)) |

In addition to the four action functions discussed above, we now add two predicates for defining hierarchical action descriptions:

body(Action, ActionBody)
in_body(ActionBodyElement, Action)

The first predicate (body) maps an action into an ActionBody compound action expression. There may be more than one Action that decomposes into the ActionBody, but each Action only has one Body. The In_body predicate relates an element of an ActionBody with the higher level Action of which it is a part. It could be one of the sequential actions, or a conditional or disjunctive action. There could be more than one Action that contains ActionBodyElement.

As an example of action decomposition, we might have the following:

$$body(informif(S, H, P), disj(inform(S, H, P), inform(S, H, \sim P)))$$

This last example shows that an informif speech act from S to H that P (i.e., informing whether P is true) can be decomposed into the disjunctive act of S's informing that P or informing that ~P. The precondition and effect of the informif action are determined by the disjunctions of the preconditions and effects of the constituent inform actions. For example, the precondition can be shown to be knowif (S,P). A similar definition can be given for the speech act assertif.

The value of the body function is another action expression providing a hierarchical decomposition. Likewise, the predicate in_body looks for any action within a named complex action description, searching through the entire complex action library. For example, in_body(inform(S,H, P), informif(S, H, P) is true because the inform action is part of the body of the informif action (as shown above).

The last predicate that operates over Actions provides the unbound or unknown variables in the Action. In order to execute any Action, the system needs to know what that Action:

unknown_obligatory_argument(Action, UnboundRoleList)

To say that the Agt does not know one of the variables for an action she wants to execute, we use:

\+knowref(Agt, Var^pgoal(Agt,done([Agt,Act,Constraint),Loc,Time]), with Var being a variable.

If not, a Role:Var #Type expression is added to the UnboundRoleList

Described herein is how the system implements reasoning given the above formulas. In implementations, the reasoning can be done by, for example, the reasoner 250, the dialogue manager 240 and components therein, and/or combinations thereof.

There are two meta-interpreters used to reason about modal formulas, one for proving (istrue) and one for asserting (→). The term "meta-logic interpreter or meta-interpreter" is understood as providing the logical meaning and inferences to a logic, in the fields of logic programming, human-computer dialogue and multimodal interaction systems. This is a common technique in logic programming, though no one had previously applied it to reason about beliefs, goals, and intentions.

Non-modal formulas are put into negation normal form (negations only take literals as their scope), and are proven using a standard Prolog interpreter. In other words, the modal meta-interpreter will transition to the Prolog interpreter if given a non-modal formula. Modal formulas are proven with istrue invoked from a standard Prolog rule ':-'. The assertional meta-interpreter→handles assertions of modal formulas, whereby instead of asserting the LHS, the RHS is asserted. With it, we ensure that the least embedded formula possible is entered into the database, subject to the logical semantics. This also means that the LHS clause would not be found in the database as it is rewriting the LHS into the RHS. Finally, we have a rule operator '=>' for planning and plan recognition rules. The LHS is proven using istrue, and the right hand side is asserted with '→'.

The system is driven by its maintaining the rational balance among mental states. Thus, it is able to reason about one agent's goals to get an agent (itself or another agent) to believe or come to know whether a formula is true, to intend an action, or come to know the referent of a description. The semantics of the individual modalities, as expressed in the possible worlds framework, elegantly describes the meanings of the combinations of these formulas and the implications of their becoming true. Moreover, the theory of intention in CL90 is able to provide a semantics for the internal commitments that the intender takes on, and the conditions under which those commitments can be given up. The system is built to provide an operational semantics that accords with the logical ones through its inference rules and BDI architecture.

In addition to the axioms for belief and goal described herein above, examples of inference and rewriting rules are provided herein that the system employs with respect to cross-modal inference. These rules together are an attempt to maintain the least embedded formulae possible, subject to the semantics of bel, goal/pgoal, intend, knowif, and knowref. Sometimes the same formula will be in both forward and backward reasoning rules below because there may be cases where a condition needs to be proved, even though the system has not yet tried to assert it and thus create the more compact version. For simplicity of description, "Var^Pred" is used as a shorthand for "variable:Var #Type, predicate:Pred", where Pred is a predicate one of whose arguments is Var.

Described herein is the meta-interpreter associated with proving, where:
Proving←: if trying to prove the left side, prove the right side (as in Prolog)

These predicates take a list of arguments, the first of which specifies the agent, then the action, and finally the location and time. We take do and done to be satisfied at a future/prior time, respectively (as they take a specific time as an argument). In addition to taking primitive actions as arguments, these predicates are defined over complex actions, such as conditional, sequential, and disjunctive actions. For example, a disjunctive action has been done at some location and time if either of its disjuncts has been done at that location and time (where time can include dates). For example:

istrue(done([action([Agt, disj(Act1, Act2), Constraint, Loc, Time]) :-
  istrue (done ([Agt, Act1, Constraint, Loc,Time]) $\lor$
  istrue(done([Agt, Act2, Constraint, Loc, Time])).

Currently, we have found it sufficient to say that a conditional action condit(P,Act) has been done if Act has been done and the predicate P is true. For example:

istrue(done([action(Agt, condit(Pred,Act), Constraint,Loc,Time]) ) :-
  istrue(Pred) $\land$ istrue(done([action(Agt,Act, Constraint),Loc,Time])).

where istrue(P) is a call to the '←' meta-interpreter

We will say a sequential action of seq(Act1,Act2) has been done if Act1 has been done and Act2 has been done afterwards in a circumstance in which Act1 has been done. For example:

istrue(done([action(Agt, seq(Act1,Act2), Constraint), Loc, Time]) :-
  istrue(done([action(Agt, Act1,Constraint), Loc1, Time1])) ,
  istrue(done([action(Agt, condit(done([action(Agt, Act, Constraint), Loc1, Time1]),
    Act2),
      Constraint2, Loc2,Time2]) )) )

The doing predicate applies to actions that have a hierarchical decomposition, such that once the higher-level action has been decomposed into its body, and the system is executing one element of the body, then the system is asserted to be doing the higher level action. If the system has done the last element of the body, as recursively defined, then doing(Agt,Higher_Level_Action,Location,Time) is retracted and done(Agt,Higher_Level_Action,Location, Time) is asserted.

Described herein are formula rewriting rules.

Asserting→: if asserting the left-hand side (LHS), instead assert the right side. Importantly, these are rewriting rules, not inference rules, in that the LHS is not asserted to be true. On the LHS, we will use the expression 'and' to mean that istrue(bel(X, bel(X,P))) :- istrue( bel(X, P))
istrue (bel(X, P $\land$ Q)) :- istrue( bel(X,P), bel(X,Q))
istrue(bel(X, pgoal(X,P))) :- istrue(pgoal(X,P))
istrue(bel(X, knowref(X, Var#Type ^Pred))) :- istrue( knowref(X, Var#Type^Pred)))
istrue(bel(X, knowref(X, Var#Type ^(Pred, Cond)))) :- istrue( knowref(X, Var#Type^Pred))),
  istrue(Cond)
istrue(knowif(X, P)) :- istrue(bel(X, P)) $\lor$ istrue(bel(X, ~P))

There are also a number of other rules including, for example, meta-interpreting conjunctions and disjunctions.

Described herein is proving Done as applied to complex actions. There are several predications that take action expressions as an argument, namely do, done and doing.

what follows it is a constraint. That is, the agent is asserting the first literal, and if the formula following 'and' is true, then rewrite with the right-hand side. For example:
  bel(X, bel(X,P))→bel(X, P)
  bel(X, P $\land$Q)→bel(X,P), bel(X,Q)

bel(X, knowref(X, Var^Pred))→knowref(X, Var^Pred))
knowref(X, Var^(bel(X, Pred))))→knowref(X, Var^Pred)
knowref(X, Var^Pred)) and Var is a constant→bel(X, Pred)
pgoal(X, P ∧Q, R)→pgoal(X, P, R), pgoal(X, Q, R)
pgoal(X, pgoal(X,P, Q), Q)→pgoal(X,P, Q)
pgoal(X, intend(X, A, Q), Q)→intend(X, A, Q), where A is a (potentially complex) action. If agent X wants to intend to do action A, then the agent in fact intends to do A.
pgoal(X, knowref(X, Var^Pred), Q) and Var is a constant, →pgoal(X, bel(X, Pred), Q). During reasoning, Var can become bound to a constant. Because knowref is defined to existentially quantify Var into the agent's beliefs, the possible worlds semantics shows that the agent believes Pred is true of that constant.

--- pgoal(X, knowif(Y, P ∧ Q), R) → pgoal(X, knowif(Y, P), pgoal(X, knowif(Y, P ∧ Q), R) ) ,
  pgoal(X, knowif(Y, Q,), pgoal(X, knowif(Y, P ∧ Q), R) )

---

If the agent is asked to assert that it wants to know whether P^Q, it asserts that it wants to know whether P and wants to know whether Q, both relative to the pgoal to know whether P^Q holds. For example:

bel(X, pgoal(X,P, Q))→pgoal(X,P,Q) If the agent believes it has a goal, then it does.

Described herein are applicability conditions and blocked intentions. The following rule is adopted for applicability conditions: given action, A, applicability condition AC, agent, Agt, and a relativizing condition, Q:

--- applicability_condition(A, AC) and bel(Agt,~AC) → bel(Agt, □~done(Agt,A)),
  ~intend(Agt, A, Q).

---

Recall that for a given action, the applicability conditions cannot be made true. The above rule means that, if AC is an applicability condition to do action A, and the agent believes it is false, the agent itself cannot possibly do anything to make AC true, so then the agent would drop (or not adopt) an intention to do A. If the agent simply does not know the truth of AC, then it may form the pgoal to knowif AC holds, and form the intention to do A but declare it as blocked. In blocking an intention, the system will prevent its being further examined (e.g., engaging in finding values for arguments, decomposing the action, or backward-chaining on preconditions) until the blockage is removed. For example:

--- applicability_condition(A, AC) and ~bel(Agt,AC) →
  blocked(intend(Agt,A,Q)) ,
  pgoal(Agt, knowif(Agt, AC) , intend(Agt, A, Q))).

---

We also assume every rule that has intend in the LHS, also has ~blocked(intend( . . . )) as a conjunct in the antecedent. The conjunct is suppressed throughout the description for sake of readability.

Described herein is equality and reference resolution.

In the course of planning, the system generates equalities between variables appearing in different goals. Unlike graph representations that can accommodate multiple pointers to the same node, sentential reasoning requires that variables appearing in different formulas be explicitly stated as being equal. Prolog forces this representation as it generates new variables for any formula that is asserted into the database. The relationship among variables in different formulas therefore needs to be stated as one of equality. For example, if we record the equality for the covid vaccination center that the user (u1) wants to go to is the same as the covid vaccination center at which the user wants to be vaccinated. Likewise, the time that the user intends to be vaccinated is the same as the time at which the user wants to have an appointment. In the sample dialogue, at some point the system reasons that 'cvs' is a covid vaccination center that satisfies the user's goals, which then enables all of equalities to be resolved if needed.

Equality reasoning is prevented from crossing modal operators. For example, "I believe that the morning star=evening star", but "John does not know that the morning star=the evening star" need to be jointly satisfiable. I cannot use my beliefs of equality to reason about what John believes. However, the system can reason with "the X that John believes to be the morning star=the Y that Mary believes is the evening star" (quantifying X and Y into their respective beliefs). Thus, the system should be able to reason about X and Y, but not attribute those beliefs to John or Mary. The system reasons about equality among variables by maintaining equivalence classes of equalities. Table 3 shows an example of such equivalence classes created after the first sentence of the example shown. Notice that these are all quantified-in variables, but the system does not attribute these equalities to the user's beliefs because the semantics of quantified-in goals is that the value is the same in all the agent's goal worlds, but not necessarily in all the agent's belief worlds.

This same equality reasoning mechanism enables the system to represent and resolve co-referential and anaphoric references. Because the equality relationship is declarative, if an ambiguous reference is detected, the system can plan a question to disambiguate the intended referent (<referring expression>='a' or <referring expression>='b').

Described herein are speech acts. In the study of semantics, philosophers and linguists once only considered utterances that were true or false. In the seminal book "How to do things with words," the philosopher Austin (1962) upended this approach by arguing that utterances are actions that change the world. Dubbed illocutionary acts or "speech acts", this radical shift in thinking began the study of linguistic pragmatics. The plan-based theory of speech acts argued that people plan their speech acts to affect their listener's mental and social states, and showed how speech acts could be modeled as operators in a planning system. Thus, a system can likewise reason about the effects that its listener's speech acts were intended to have on its own mental states. Planning and plan recognition became essential to such pragmatic analyses of language in context because speech acts could then be incorporated into an agent's task related plans when the agent determines that it needs to know/believe something, or needs to get the user to intend to perform an action.

Given the logic described herein and the tools for describing actions, examples of some implemented speech acts are provided. Note that speech act definitions are domain independent. Some of the example speech acts include, but are not limited to, inform, informref, assert, assertref, Wh-questions, Yes-No questions, Requests, and Verification Questions.

The first action expression considered is that of an inform by a Speaker to a Listener that formula Pred is true. The Precondition for this action is that the Speaker believes what she is saying. The Effect is stated as the Listener's believing that Pred holds. Recall that the listed Effect of this action description does not become true as a result of performing the action. Rather, the Listener comes to believe that the Speaker had a persistent goal that the Effect holds. We will ignore the constraint parameter for the time being. For example:

```
action(Speaker,
    act:inform([Speaker, Listener, Pred])
    constraint:            Cond,
    precondition:          bel(Speaker,Pred),
    effect:                bel(Listener,Pred)
)
```

Informref is a speech act that gets the listener to know that the value of the variable Var is such that Pred is true of it. For example, when the user says "Monday" in response the wh-question "when do you want to eat?", the intended effect is that the listener come to know that the referent of "the date the user wants to eat" is Monday. For example:

```
action(Speaker,
    act:informref([Speaker, Listener, Var^Pred],
    constraint:Cond,
    precondition:knowref([Speaker, Var^Pred]),
    effect:knowref([Listener, Var^Pred])
)
```

Assertions are different from Informs in that the intended effect is to get the listener to believe that the speaker believes the propositional content, whereas the intended effect of an inform is that the speaker comes to believe the propositional content. Thus, we have:

```
action(Speaker,
    act:assert([Speaker, Listener, Pred])
    constraint:            Cond,
    precondition:          bel(Speaker,Pred),
    effect:                bel(Listener, bel(Speaker, Pred))
)
```

Assertref is similar to Assert in that the intended effect of the speech act is that the listener come to know the referent of the variable such that the speaker believes Pred is true of it. Assertref can be used to find out what the speaker believes, even if the speaker is not trying to convince the listener. For example, teacher-student questions or verification questions employ Assertref. For example:

```
action(Speaker,
    act:informref([Speaker, Listener, Var^Pred],
    constraint:Cond,
```

-continued

```
    precondition:knowref([Speaker, Var^Pred]),
    effect:knowref([Listener, Var bel(Speaker, Pred)])
)
```

A speaker asks a Wh-question to Listener about the referent of Var such that Pred is true. For example:

```
wh-q(Speaker, Listener, Var^Pred) , where Var is free in Pred
    precondition:      knowref(Listener, Var^Pred)
    constraint:        Cond,
    effect:            knowref(Speaker, variable:Var^Pred)
```

The wh-question can be decomposed into a Request to do an Informref speech act followed by an InformRef. At times, the system needs to be able reason with these speech acts individually. The wh-question action definition assumes the listener is the same as the agent who will tell the speaker the answer, but having the individual speech acts means the system can plan them directed toward different agents.

Recall that we do not claim the Effect of a speech act becomes true in virtue of the act's being performed. Because these are planning operators, the Effect becomes a pgoal of the planning agent. Conversely, on observing an agent performing an action, including a speech act, the observer comes to believe the planning agent had the Effect as a pgoal. So, on hearing a wh-question, the Listener comes to believe that the speaker has a pgoal that the Speaker come to know the referent of the description.

During backward-chaining, the planner may unify the content of a goal formula with the Effect of an action and choose to consider that action as a means to achieve the goal. However, the matching of the Effect may not provide a binding for the Listener. If the Listener is not specified, evaluating the Precondition may enable it to determine who knows the answer and ask that agent the wh-question.

A yes-no question is described as:

```
ynq([Speaker,Listener, Pred])
    precondition: knowif( [Listener, Pred]),
    constraint: Cond,
    effect: knowif([Speaker, Pred])
```

Thus, if the system has the pgoal to achieve a knowif formula, it can adopt the pgoal to perform a ynq directed at someone whom it believes knows whether Pred is true. A yes-no question from speaker S to listener U whether predicate P is true can be decomposed (via the Body relation) as a sequence of the speakers's requesting the U to do an informif action, followed by the informif action. That is:

seq([request(S,U, informif(U,S,P)), informif(U, S, P)])).

In addition, the informif(S,H,P) action can be defined as a disjunctive action:

informif(U,S,P) can be decomposed into: disj(inform(U, S,P), inform(U,S,~P)

Requests are a paradigmatic example of a larger class of actions, the directives that also includes commands, recommendations, suggestions, etc. From this class, the system uses requests and recommendations, which differ in terms of whether the action being requested/recommended benefits the speaker or the listener, respectively. The definition of request is given below in Table 5 as a Prolog rule in order that some of the parameters be computed based on the embedded Act.

TABLE 5

```
action(Speaker,
    request([Speaker,
        Listener,
        Act
    ]),
    constraint:        bel(Speaker, Cond),
    precondition:      bel(Speaker, ReqPre),
    applic_cond:       bel(Speaker, AC),
    effect:            intend([Listener,
        do([action(Listener, Act,Cond),
            Location, Time])] ,
        _RelRef)
    )
:-
    precondition(agent:Listener#agent,act:Act, ReqPre),
    constraint(Listener, Act, Cond),
    applic_cond(agent:Listener#agent, act:Act, AC),
benefits(Act, system).
```

A Request from Speaker to Listener that Listener do Act has a precondition that the Speaker believes the precondition of Act holds. The applicability condition of the Request is that the Speaker believes the applicability condition of the Act is true, and the constraint on the Request is that the speaker believes the constraint of the requested act holds. Finally, the desired effect of the Request is that the Listener intends to do Act. See Table 5 for the definition. Finally, notice in the last line of the definition that a request can only be planned if the requested act benefits the speaker.

A number of application scenarios require that a user be verified by answering questions for which the system already has an answer in its database. The system's goal here is not for the system to come to know the answer, but for the system to come to know what the user thinks is the answer. In order to do so, the system employs an additional type of speech act, called assertref. Here, the precondition is that the Speaker knows the referent of "the Pred", and the desired effect is that the Listener come to know what the Speaker thinks it is. In planning the verification question, the system (as Listener) then requests this assertref action. Notice that the effect of the assertref involves an existential quantifier whose scope is the Listener's belief of the Speaker's belief. For example:

```
action(Speaker,
    act: verifyref([Speaker, Listener, Var^Pred]) ,
    precondition: knowref(Listener, Var Pred),
    constraint: Cond,
    effect: knowref(Speaker, Var^bel(Listener,Pred))
    body:
        seq([request(Speaker, Listener,
            assertref(Listener, Speaker, Var^Pred) ),
            assertref(Listener, Speaker, Var^Pred)
        ),
    ])
```

Collaboration is so essential to society that we teach our children to be collaborative at a very early age. However, our systems, even those dubbed as "assistants," don't know how to be helpful. At the dialogue level, they are generally incapable of inferring and responding to the intention that motivated the utterance. To overcome this failing, the system described herein is built to assist its conversant(s) in achieving his/her goals. Previous systems attempt to infer their conversants' plan that resulted in the communication, and then to ensure that the plans succeed. The present system attempts to behave according to JI Theory principles. A central feature of this approach is that the system will attempt to infer as much of the user's plan as it can, will try to identify obstacles to its success, and plan to overcome those obstacles in order to help the user achieve his/her higher-level goals. Thus, plan recognition and planning are essential to the system's architecture and processing. Described herein is the system's collaborative planning and plan recognition. This can be performed, for example, by the dialogue manager 240 and components therein.

Rather than representing a plan as a pure graph structure of actions, the system's plans consist of a web of interdependent logical forms describing mental states, notably beliefs, persistent goals and intended actions. Based on an epistemic planning and recast in the logic and speech act theory provided in CL90, the system's planning and plan recognition make extensive use of reasoning, as it derives and attributes new mental states of the user. The system generalizes the original plan-based dialogue research program by planning with multiple declaratively-specified mental states, including persistent goal, intention, belief, knowif, and knowref.

The system has a hybrid planning algorithm as it both engages in backward chaining from desired effect to one or more chosen actions that could achieve those effects, and decomposes hierarchically defined actions into more primitive ones as a hierarchical task network planner. This planning algorithm is similar in some respects to BDI planners in that the purpose is to determine the next action to perform, rather than to plan sequences of actions, though it can do that. One would not expect a dialogue planning system to engage in advance planning of back-and-forth interactions as in a game unless the world were very constrained. We also are not interested in finding a machine-learned "optimal" response, given the rather arbitrary numerical weights/probabilities and the vast space of potential logical forms (not to mention natural language utterances) that a learning system driven by a user simulator might generate. Rather, we want the system to do something appropriate and reasonable, as long as it has the means to recover from errors, respond to users' clarification questions, etc. Because the system interleaves planning, execution and so-called "execution-monitoring" that involves observing the user's actions in response to the system's (i.e., to have a dialogue), there are many opportunities to revector a dialogue towards success.

The system's planning involves the following rules, for which we use=> to separate antecedent and consequent. The formulas in the antecedent would be proven to be true via the meta-interpreter's←rules). The result of applying a planning rule is to assert the consequent. These assertions can be rewritten by the →rules.

Effect-Action Rule

If an agent Agt has pgoal to achieve a proposition P, and Agt can find an action (or actions(s)) Act that achieves P as an effect, then the planner creates a pgoal to do the action relative to the pgoal to bring about P. For example:

```
pgoal(Agt, P, Q) and effect(Agt, Act, P) =>
    pgoal(Agt, done(Agt, Act, Loc, Time), pgoal(Agt, P, Q)).
```

Given the definitions of intention provided earlier, the formula above is the expansion of an intention, as in:

intend(Agt, Act, Loc, Time, pgoal(Agt, P, Q)).

We will use intend formula wherever possible. If more than one action can be found, the planner creates a disjunctive action.

Act-Applicability Condition (AC) Rule

If the planning agent believes an Act's applicability condition, AC, is false, the action is impossible, the intention is marked as not_applicable. During the main loop of the system, intentions that are not_applicable are retracted, as are any persistent goal or intentions that are relativized to it. If the planning agent Agt does not know whether AC holds, the following rule is used to create a pgoal to knowif that AC is true, relative to the intention to do the Act. For example:

```
intend(Agt, Act, Q) and Applicability_condition(Act,AC) and \+knowif(Agt, AC) =>
pgoal(Agt, knowif (Agt, AC), intend(Agt, Act, Loc, Time, Q)) and blocked(intend(Agt, Act, Q)
```

The created pgoal to knowif potentially leads the agent to ask a question. In addition, the persistent goal/intention to perform the Act is blocked, such that no more expansion of any plans passing through that action can be accomplished until the system knows whether the AC holds. Considering the system as agent, if the system comes to believe AC holds, the relevant blocked persistent goal/intention becomes unblocked and planning to achieve that pgoal/intention continues. Hereafter, we suppress the condition on all rules that the intention and/or persistent goal to do an action cannot be blocked.

Act-Precondition Rule

In backward-chaining, if the planner determines that a precondition (PC) to an intended Act is believed to be false, the planner creates a persistent goal to achieve PC, relative to the intention to perform Act. For example:

```
intend(Agt, Act, Q) and precondition(Act,PC), bel(Agt,~PC) =>
    pgoal(Agt, PC, intend(Agt,Act,Q))
```

If the agent does not know whether or not PC holds, the system adopts the pgoal to knowif PC is true. For example:

```
intend(Agt, Act, Q) and precondition(Act,PC), ~bel(Agt,PC) =>
    pgoal(Agt, knowif(Agt, PC), intend(Agt, Act, Q))
```

Act-Body Rule

This rule enables the planner to engage in hierarchical planning. When the planner creates an intention to perform an Act that has a decomposition (Body), it creates an intention to perform Body relative to the higher-level intention to perform Act. The intention to perform Body could then lead to planning with conditionals, disjunctions, and sequences. For example:

intend(*Agt*, Act, *Q*), body(Act, Body) => intend(*Agt*, Body, intend(*Agt*, Act, *Q*))

As discussed herein, various expansions and relativizations are created between the Body action and the higher-level action. Note that the preconditions and effects of the higher-level action are derived from the structure of the Body action. In particular, the precondition of the higher-level act is the precondition of the first act in the decomposition. The effect of the higher-level act depends on the decomposition. For instance, the effect of a sequence is the effect of the last act in the sequence. The effects of the intermediate acts may or may not persist until the end, so we do not attempt to derive their status. Other rules are provided by the forward meta-interpreter which handles the assertion of intending complex actions in terms of intending its decomposed constituents. That is, a meta-logic interpreter may decompose actions into constituent parts in the body of the action, which may be referred to as hierarchical planning, and interpret the constituent parts.

Act-Knowref Rule

If an agent Agt has an intention to do an action Act (relative to Q), the agent has a pgoal to knowref the value for each of the obligatory arguments to that action relative to the intention that it does now know. If it does not know what the values are, it creates for each Var, a persistent goal to know what the Var is such that the agent intends to do the Act for which that Var is a parameter. For example:

```
intend(Agt, Act, Q) and unbound_obligatory_argument(Agt, Act, UnboundRoleList) and
foreach(Role:Var#Type in UnboundRoleList)
    do(
        intend(Agt, Act, Q)
        =>
        pgoal(Agt,knowref(Agt1,Var^intend(Agt, Act, Q)), intend(Agt, Act, Q))
    )
```

The creation of such goals may lead to planning and executing wh-questions (so-called "slot-filling" questions) by the agent. Conversely, because of helpful goal adoption (as described herein below) after the user asks a question indicating that the user has a pgoal to know the value of the variable, the system may come to have a pgoal that the user know the value of an argument to an action. Such a goal could lead the system to tell the user what s/he needs to know in order to do that action, even if not explicitly asked.

Intended Complex Actions

If the agent intends to do a conditional action and does not know whether the condition holds, the agent forms a persistent goal to come to know whether the condition holds, relative to the intention to do the conditional action. For example:

```
intend(X, condit(P,A) and \+knowif(X,P) => pgoal(X, knowif(X,P), intend(X,
condit(P,A)) )
```

If the agent intends to do a conditional action, and believes the condition is true, then the agent intends to do the action A relative to the intention to do the conditional action. If the agent intends to do a conditional action and does not know whether the condition P is true, then the agent adopts a persistent goal to know if P relative to the intention for the conditional action. Notice that this intention assertion rule shows how the system generates pgoals to knowif. For example:

intend(X, condit(P,A), Q) and bel(X,P))=> intend(X, A, intend(X, condit(P,A), Q))

Intending a mutually exclusive disjunctive action disj(A, B), results in two intentions—an intention to do action A provided action B has not been done, and similarly for B. So, whichever gets done first, will cause the other intention to be removed because the relativized intention for the disjunctive act has been achieved. For example:

```
intend(X, disj(A,B), Q) => intend(X, condit(~done(X,B), A), intend(X, disj(A,B), Q)) and
    intend(X, condit(~done(X,A), B), intend(X, disj(A,B), Q))
```

X's intending to do the sequential action seq(A,B) results two intentions: First in the agent X's intending to do the first action A, relative to the intention to do the sequence, and in X's intending to do the second action when done(X,A) is true, again relative to the intention to do the sequence. For example:

```
intend(X, seq(A,B), Q) → intend(X, A, intend(X, seq(A,B), Q)) and
    intend(X, condit(done(X,A),B), intend(X,seq(A,B), Q)),
```

Described herein are plan recognition rules. The system engages in plan recognition by expanding the user's plan, expressed in terms of appropriately relativized persistent goals and intentions, according to various rules as shown below Act-Effect Rule If the system has attributed to the user U a persistent goal/intention to perform an action Act, then assert that U has a persistent goal to achieve the effect E of Act relative to the pgoal to have done Act. For example:

intend(Agt, Act, Q) and effect(Agt, Act, E)=> pgoal(Agt, E, intend(Agt, Act, Q))

Precondition-Act Rule

If the system has attributed to Agt a pgoal(Agt, P, Q) and P is the precondition to an act Act, then attribute to U the intention to do Act relative to that pgoal. For example: pgoal(Agt, P, Q) and precondition(Agt, Act, P)=> intend (Agt, Act, pgoal(Agt, P, Q))

Note that P could enable multiple acts, e.g., $A_1$ and $A_2$. The system would then attribute to Agt the:

intend(Agt, disj($A_1$,$A_2$), pgoal(Agt, P, Q))

Body-Action Rule

If the system has attributed to Agt the persistent goal/intention to perform a complex act Body, and Body is stated as the decomposition of a higher-level act Act, then attribute to Agt the persistent goal/intention to perform Act. This essentially enables "plan parsing". For example:

```
intend(Agt, Act, Q), in_body(Act, Higher) => intend(Agt, Higher,R) and
    Q = intend(Agt, Higher,R)
```

Note that the relativization of the higher-level act is as yet unknown, but the relativization of the intention for the lower level act has been unified with the intention for the higher level one.

Know-if-Exists Rule

If S has attributed to Agt the pgoal to know whether or not there is an X such that Pred, where Pred is a schematic predicate variable that has a free variable Var, then attribute to Agt the pgoal to know what "the P" is. Formally:

```
pgoal(Agt, knowif(Agt, ∃X^Pred ) Q)=>
    pgoal(Agt, knowref(Agt, X^Pred) , R) and Q = pgoal(U,knowref(Agt, X^Pred)
, R)
```

For example, if Agt wants to know whether there is a nearby vaccine center, then attribute to Agt the pgoal to know the referent of "nearby vaccine center". This would enable the Val-Action inference.

Val-Action Rule

If Agt has a pgoal(Agt, knowref(Agt, X #Type^Pred)), and X #Type is a required argument in some action Act and Act has a constraint predicate C, then create a persistent goal to have done Act additionally constrained by Pred.

```
pgoal(Agt, knowref(Agt, X#Type^Pred)) and
unbound_obligatory_argument(Agt, Act, UnboundRoleList) and
member(Role:X#Type, UnboundRoleList) =>
    pgoal(Agt, knowref(Agt, X#Type^pgoal (Agt, done(action(Agt, Act, and(C, Pred))
)
    Loc, Time), Q)
```

For example, if Agt wants to know the location of the nearest vaccination center, then Agt may want to go to that location (the nearest vaccination center). For example:

```
pgoal(Agt,knowref(Agt, X#location^nearest(Y#vaccination_center, location(X#location,
Q)))) =>
pgoal (Agt, knowref(Agt, X#location^pgoal(U, done(action(Agt,
    go_to(Agt, destination:X#location),
    constraint:nearest(Y#vaccination_center,
        location
([object:Y#vaccination_center,
        location:X#location])),
    Loc, Time), Q)), R)
```

That is, agent Agt wants to know the location to which Agt wants to go, which is the location of the nearest vaccination center.

Knowif-Action Rule

If the pgoal(Agt, knowif(Agt,P), Q), and P is an applicability condition for an Act, then attribute to the Agt the pgoal to have done that Act (i.e., the intention to do Act). Notice that because this is a plan recognition rule, the relativization argument of the pgoal to knowif is the pgoal to perform the Act. Formally:

```
pgoal(user, knowif(Agt,P), Q) and applicability condition(Act, AC) =>
Q = intend(Agt, Act, R)
```

Normal-Activity Rule

If Agt has a pgoal to be located at a place P, then attribute to Agt the pgoal to do the normal activity one does at location P. For example, if Agt has a pgoal to be located at a movie theater, then attribute to Agt the pgoal to watch a movie. For example:

```
pgoal(Agt, location(Agt, Place), Q) and normal_activity(Place, Act) =>
    intend(Agt, Act, pgoal(Agt, location(Agt, Place), Q) )
```

Negative State Rule

If the Agt is in a negative state (of which there are a list of domain dependent types), infer that the agent wants to be in the corresponding positive one. For example, if the agent has lost her phone, infer that the agent wants to have found her phone. If the agent's phone has been damaged, infer that the Agt wants her phone to be repaired. For example:

```
bel(Agt, negative_state(State, Agt))), bel(Agt, positive_state(State, PosState)
)=>
    pgoal(Agt, positive_state(PosState, Agt)
```

The system is driven by its persistent goals, which results in its planning to achieve them, and/or helping its user to achieve his/her goals. Described above are how many of persistent goals are generated. Below we elaborate on other ways that pgoals arise.

Collaborative Goal Adoption

Because the system is collaborative, it will adopt as its own those goals that it attributes to the user. For example, if it believes the user wants to be vaccinated, it will adopt the goal that the user be vaccinated. However, such goal adoption is not absolute. Thus, if it believes the user or the system is not allowed to adopt the goal, it will not. More formally, if the system believes the user has P as a pgoal, and the system does not have a pgoal that ~P, then the system adopts the pgoal that P relative to the user's pgoal. That is:

$$pgoal(user, P, Q) \wedge \backslash +$$
$$pgoal(sys, \sim P, R) => pgoal(sys, P, pgoal(user, P, Q)))$$

For example, if the system believes the user wants to knowref P(e.g., =the secret formula for Coca Cola), and the system does not want the user not to know it, the system adopts the goal that the user knowref P. However, should the system not want the user to knowref P, then the system does not have to adopt the user's goal and plan to satisfy it. Notice also that if the system comes to believe that the user no longer wants P, then the system can drop its pgoal that P, which would then lead to its dropping any intentions it had created to achieving P.

Generating Goals to Knowif by Rule Decomposition

The system generates goals to know whether or not a proposition P is true in numerous ways. First, if P is a precondition to an intended action A, the system will generate a pgoal(sys,knowif(sys,P), intend(sys, A,Q)) as described herein above. If the system later learns that P is false, it may then attempt to make it true. If the intention to do A is dropped, the pgoal to knowif(P), and anything depending on it, such as the likely intended YN-question, can be dropped as well. Second, if P is an applicability condition to an intended action A that the system does not knowif, the system will attempt to prove that knowif(sys,P). If it does not knowif(P), it also generates the pgoal(sys, knowif(sys,P), intend(sys,A,Q)). In both cases, it blocks the intention such that no further planning is done with that intention until it comes to knowif(sys, P). If it comes to believe the applicability condition is false, then P is impossible for it to achieve, it retracts the intention and unwinds the plan subtree that depends on it. If it comes to believe a precondition is false, it will attempt to create a plan to achieve it.

Given a pgoal(knowifP)), the system can plan a yes-no questions (YNQ that P), provided it can find a listener whom it can ask and whom it believes knowsif(Listener,P). This may involve asking someone other than the user (in the example, it is the pharmacy CVS).

Another special case of generating goals to knowif(sys,P) arises when P is defined in terms of a disjunction of Prolog clauses. For example, one might state a rule that a person is eligible for the Covid vaccine if:

Clause 1: The person's age is greater than 65, or
Clause 2: The person's age is between 45 and 64, and the person is caring for someone who is disabled, or
Clause 3: The person's age is less than 45 and the person is an essential worker If the system has a pgoal to know whether the user is eligible for a covid vaccine:
pgoal(sys, knowif(sys, eligible(User, covid_vaccine)))
The system also generates:
pgoals(sys, knowif(sys,Clause1), pgoal(sys,knowif(sys, eligible(User,covid_vaccine)))) and similarly for pgoals to knowif Clause 2 and Clause 3. Notice that these three pgoals are made relative to the eligibility pgoal, such that if any of the pgoals is achieved, eligibility becomes true, so the other pgoals are dropped.

Described herein are semantics of slots.

In the present plan-based dialogue system, slots are quantified-in goals, such as the time you want to the system to make an appointment for a vaccination. Assuming the user wants the system to make an appointment, the system's goal adoption and planning would generate pgoals of knowing the date and knowing the time for which the user wants to make an appointment.

Using the definition of knowref and the semantics described CL90, we can now provide a meaning to statements like: the system wants to know the date for which the user wants it to make an appointment for the user.

This is represented as (showing an existential binding for other variables that we have so far been suppressing):
pgoal(sys, knowref(sys, Day^pgoal(U,user,
    ∃Time^ done(sys, make_appointment(sys, user, Day, Time),
    Loc, Time2)), Q)

Expanding knowref into its definition, we see that his formula essentially quantifies into two levels of modal operators—bel and pgoal, namely:

pgoal(sys, ∃Day^bel(sys, pgoal(user,
    ∃Time^done(sys, make_appointment(sys, user,
    Day, Time),
    Loc, Time2), Q))

The system wants there to be a Day of which the system thinks the user wants there to be a time such that system makes an appointment for the user on that day and time.

To make sense of such statements, consider that bel(Agt, P) means that P is true in all of agent Agt's B-related possible worlds. The meaning of ∃X bel(A,p(X)) is that there is some value of X (call it d) assigned to it by the semantics of the "valuation" function v in the world in which the formula is evaluated, such that the same value assigned to X in all of A's B-related worlds satisfies p(X). Because the existential quantifier out-scopes the universal quantifier, the chosen value d is the same choice in every related world such that p(d).

As modal operators are embedded, the corresponding chains of B and G-relatedness continue, with the same d being chosen in all of them.

Referring now also to FIG. 4, assume the system has a pgoal that there be a Day upon which the system thinks the user wants the system to make an appointment at a vaccine center. This would likely result in a question like "When would you like me to make the appointment?" The user model contains a default assertion that the user knows what s/he wants, so by default the user knows when s/he wants to have appointments. However, the user might say "I don't know," or might say "Mary knows the day," or say, "ask Mary". We adopt the Gricean heuristic that the user would have said the day if s/he knew it, and s/he didn't, so s/he doesn't know the day. The general default still holds, but a specific neg(knowref(the Time[158] . . . )) would then be asserted, which would cause the specific default to be inapplicable. This would prevent the system from asking the same question again, as the precondition would no longer hold.

The system plans the Whq speech act when the effect of that speech act above matches the content of the system's pgoal, provided that the system believes the precondition holds, i.e., the system believes that the user knows the referent of "the time User wants to make an appointment". If the system does not believe the user knows the referent, but knows of someone else who does, it could plan a question to that other agent.

Described herein is handling constraints on slots. Every wh-question has a Variable and a Predicate which constrains its value. When the user conjoins another predicate, it further constrains that value. So, if the system wants to know the time that the user wants an appointment, the system has the following pgoal:

pgoal(sys,knowref(sys,Time^pgoal(user,done([sys,make_appointment(sys,user,Day, Time),
    constraint: Cond)
  Loc, Time2]), R) ), Q)

When the user says: "after 10 am", the system then has (assuming the variable Day has already been given a value):

pgoal(sys,knowref(sys,Time^pgoal(user,done([sys,
        make_appointment(sys,user,Day, Time),
          constraint:and(Cond,
      after(Time,10am))),
        Loc, Time2]), R) ), Q )

Critically, as shown here, the after constraint needs to be in the scope of the user's pgoal, because it is not simply that the system believes the time is after 10 am, but that the user wants it to be after 10 am. Another example of a constraint ("the earliest time available") can be found in the sample transcript.

In the course of this processing, the system retracts the formula such that:

knowref(user, Time^ pgoal(user, done([sys,make_appointment(sys,user, Day, Time),
  constraint:Cond
  Loc, Time2]), R) ), Q)

That is, the user does not know what time s/he wants the system to make the appointment.

Described herein are the operational semantics and/or BDI architecture.

Belief-desire-intention (BDI) architectures have been researched for many years. Reactive architectures such as PRS were inspired by philosophical and logical theories, and essentially sensed changes in the world that updated the system's state (its "beliefs"). The architecture determined which of its pre-packaged "plans" could be used to achieve its "goals" in that state. These architectures expand the plans hierarchically to decide what to do. It has been shown that the inner loop of such BDI architectures is isomorphic to HTN (Hierarchical Task Network) planning. However, neither BDI architectures nor HTN-based systems engage in plan formation, nor do they reason about other agents. The system needs to be declarative in order to reason about the user's beliefs, goals, and intentions.

Figure 5:
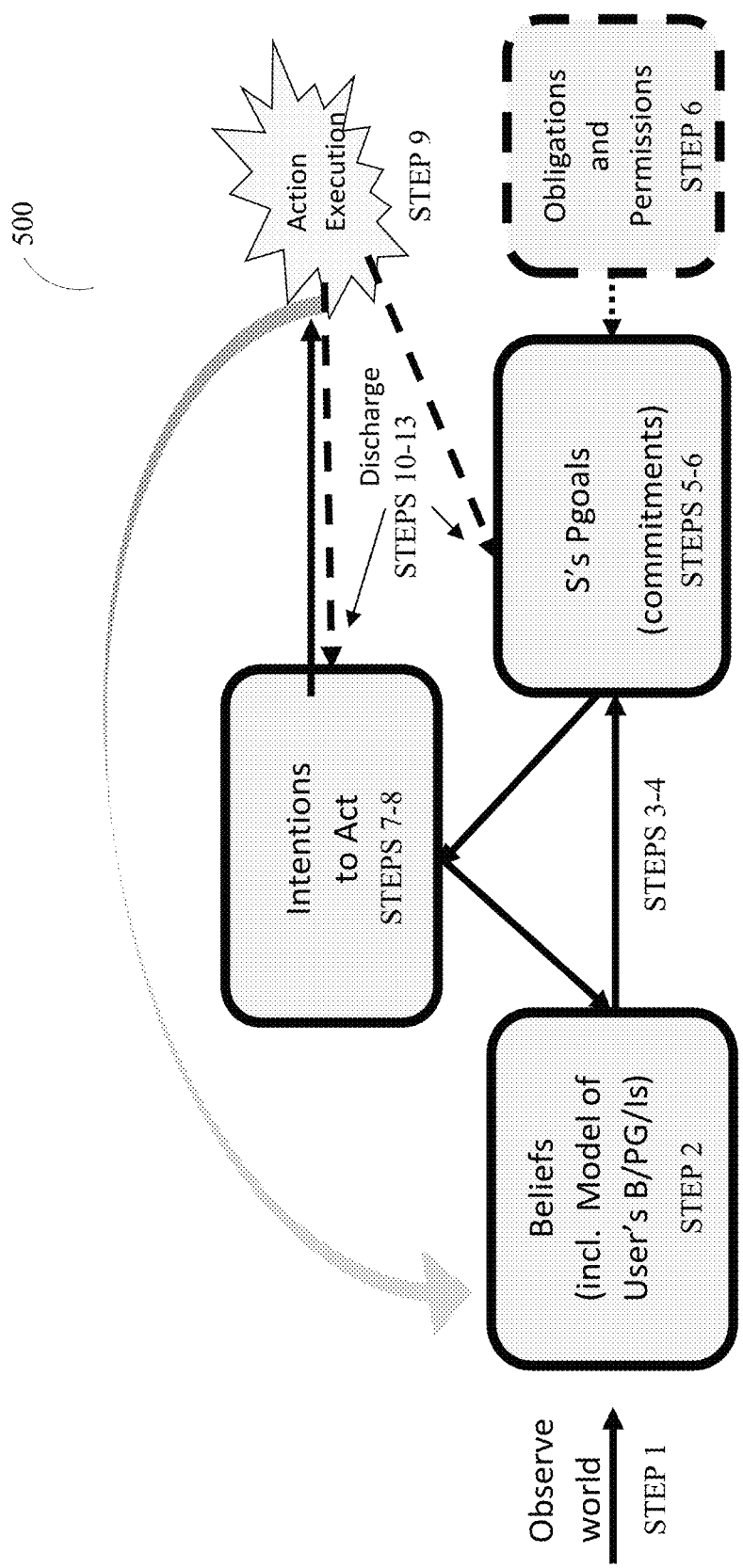
FIG. 5 is an example of an architecture and operational loop in accordance with embodiments of this disclosure.

Reference is now also made to FIG. 5, which is an operational loop 500 for a BDI architecture and performed by the system. The system relies on the declarative representation and reasoning processes described above, as well as the intention formation and commitment processes in CL90 that state the relationships among intentions, persistent goals, and beliefs. The operational loop 500 can be performed in or by a processor, such as the processor 220 and the components therein.

In the operational loop 500, the system (S) observes, based on multimodal inputs captured and obtained from sensors, such as the sensors 215A-C, and processed through multimodal recognizers, such as the multimodal recognizers 230, and the multimodal parser, such as parser 232, a user's (U) action(s) Au including, for example, speech acts (step 1).

The system asserts that U wants (i.e., has pgoal for) the Effect (E) (step 2). If Au is a speech act, S asserts that U wants S to believe U wants the Effect. If S trusts U, this will collapse the "U wants S to believe" into U wanted the Effect. However, if S has reason not to trust U, then S need not have the lesser embedded pgoal. This enables S to protect its innermost mental states from untrustworthy agents, which will alter its goal adoption and what it then plans to do. The system asserts that U believes that the precondition P of Au holds, and if S believes the action Au was successful, asserts that S believes the precondition holds (step 3). The system applies plan recognition rules until no new beliefs, pgoals, or intentions are created (step 4). The system debugs U's plan, i.e., checks the applicability conditions for U's intention(s) in the plan (step 5). For applicability condition(s) to an Act that are false, the system plans alternative ways to achieve the higher level effect of Act (step 5a). The system retracts any intentions or pgoals that are marked as not_applicable, and removes their subtree of dependent pgoals/intentions (step 5(b)). If there are no possible actions that can be performed to achieve the applicability condition, inform the user of the failure of that condition (e.g., no tickets are available).

The system adopts U's pgoals to achieve P as the System's own pgoals—i.e., pgoal(U, P, Q)→pgoal(S, P, pgoal (U, P, Q)) if P does not conflict with S' existing pgoals (step 6). Note the relativization to the user's pgoal. If the system learns the user no longer has the pgoal, the system can drop its adopted pgoal.

For S's pgoal to achieve proposition E, S plans to achieve E by finding a (possibly complex) action As that achieves it, resulting in an intention to perform action $A_s$ (step 7). If $A_s$ benefits the user, S also creates a persistent goal to know whether the user would want S to perform $A_s$. Note that the system is initialized with benefits(Act, Agt) predications for all actions it knows about. Actions can benefit the system, user, or both. For example, the make_appointment act benefits the user, not the system. So, if the system plans to do it, it needs to find out whether the user wants it to do so. If S does not know whether the applicability condition AC for As is true, formulate a question to find out whether it is. Block the intention to perform As until the truth or falsity of AC is believed (step 8).

The system executes (some of the) intended act(s) $A_s$ (step 9). Remove the intention to perform As if As was done (step 10). If As is deemed impossible (e.g., the applicability condition for As is believed to be false), the system unwinds the intention to perform As via the relativization conditions, continuing to unwind through the chain of pgoals and intentions that depend on As (step 11). If As terminates a higher-level act that S was doing, retract the doing predicate and assert done (step 12). If the execution of As fails (e.g., failure has been propagated to the system from some backend system), the system removes the intention to achieve As and plans again to achieve E for which As was planned (step 13). Again, the system informs the user of the failure of the action (e.g., the credit card could not be charged), and if the backend provides that information, the reason for the failure (e.g., card number is invalid). Repeat until no more formulas have been asserted (step 14).

The logic of intention prescribes when intentions must be abandoned. For example, in step 10, if an intended action has been performed, the intention is removed because it is satisfied. Likewise in step 11, if the system discovers that an applicability condition for an intended action is false, then (because it can do nothing to achieve applicability conditions), it takes the intended action to be impossible, and so abandons it. For example, if the system forms the intention to achieve the conditional act, condit(P,Act), and it does not know whether P holds, it forms the pgoal to knowif(S,P), relative to the intention to do condit(P,Act). That pgoal to knowif(S,P) may well lead to an intention to ask a yes-no question as to whether P holds. Because of the chain of relativizations, if the intention to do the conditional action is dropped, say because S no longer wants the effect of Act to which the conditional Act was relativized, the intention to achieve the knowif(S,P) will eventually be dropped too.

Regarding step 13, we assume for now that the system can in fact execute any of its intentions for which the applicability condition and precondition are true at the time of execution. However, this may not be true when the system requests some external agent to execute an action. For example, assume the system has gathered credit card information and sends the appropriate request to the credit card company to charge the card, only to receive a failure with a response that the card is over the credit limit. Thus, the system act failed, rather than has been done. The system would inform the user of that failure as an impossibility because it behaves according to the principles of joint intention, which entails informing the user when a joint intention is impossible to achieve. However, the system then would replan to achieve the higher-goal of finishing the transaction by asking the user for another credit card (or some other plan). It would not retry that specific card because the intention to charge that card is impossible to achieve.

The problem of intention revision with logics is distinguished from other approaches for at least the following reasons. One, the system relativizes intentions and goals to one another so that if a pgoal to achieve P is undermined because the intention/pgoal to which it is relativized has been given up, then that pgoal to achieve P may be given up as well. Two, if an intention is adopted relative to a belief, and for some reason that belief is retracted, so may the intention (e.g., "I intend to take my umbrella because I believe it may rain"). Adoption of the use of a simple database of intentions is not doable because the system needs to quantify into multiple levels of modal operators. The system does not infer beliefs because of the effects of actions stated in the action description. Those descriptions are not dynamic logic expressions per se. The agent has a pgoal for the effects, but until the agent does the action, and determines that it was successful, it does not come to believe the effect. This simplifies joint intention and belief revision, and dialogue. Three, there may be multiple reasons for forming an intention. The system might have two intentions to perform the same action A, each relativized to a different proposition. If one relativization is given up causing its relativized intention to be given up, the other intention to perform A that was relativized differently would still remain.

Referring back to the example collaborative dialogue of Table 1, the following action is defined for making of an appointment at a business:

```
action(Agent,
    act:make_appointment([Agent, Patron, Business, Date, Time]),
        constraint: Cond,
        precondition: true,
        effect: have(Patron,
            appointment(Business, Date, Time))
        applic_cond:
        available(Num_available, appointment(Business, Date,Time)),
            suchthat(Num_available > 0))
)
```

In other words, the intended Effect of an Agent's making an appointment for a Patron at a Business at some Date and Time, is that the Patron has an appointment. An applicability condition is that an appointment at that date and time must be available.

Figure 6A:
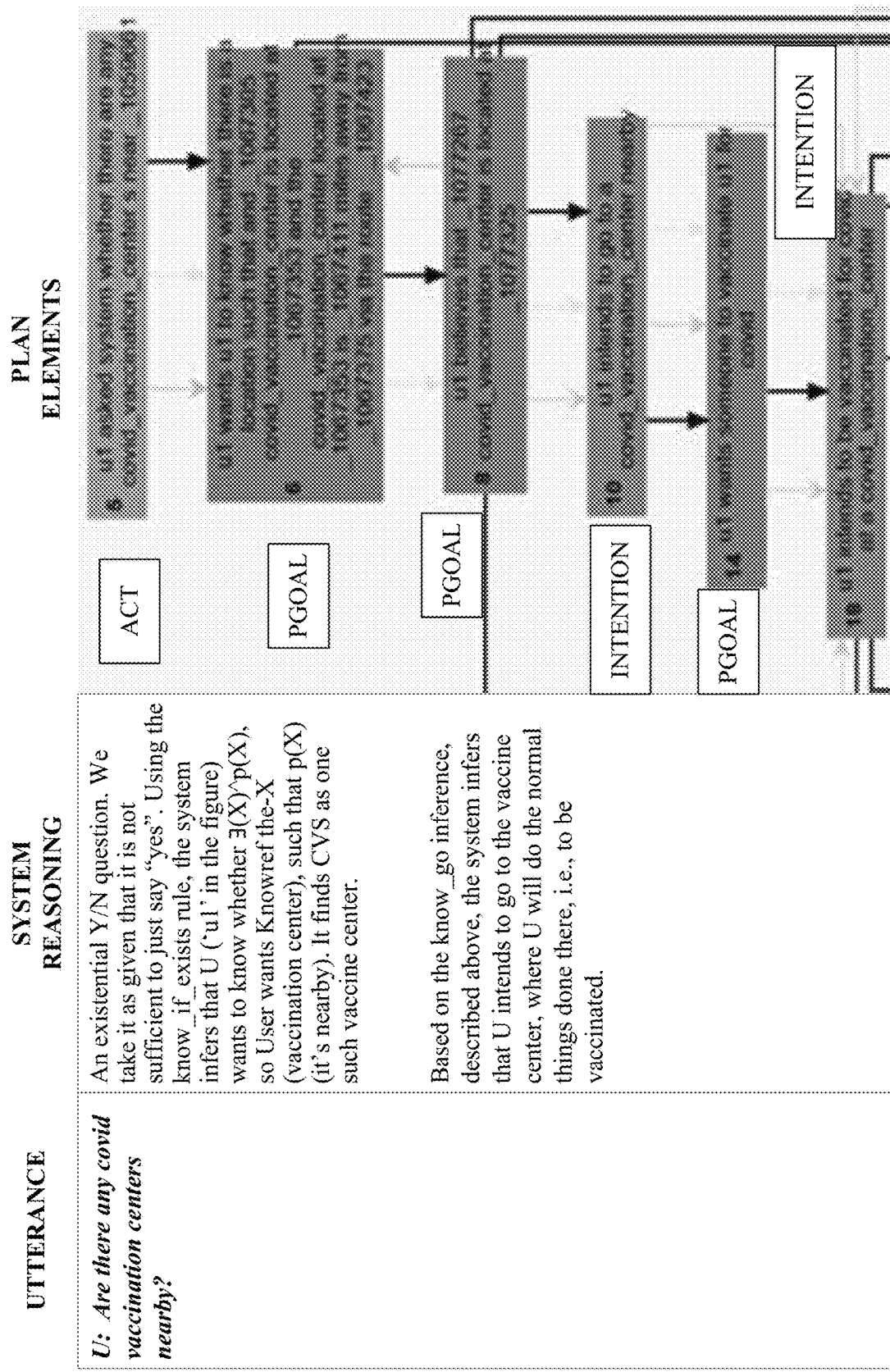
FIG. 6A-V is an example of collaborative plan-based dialogue in accordance with embodiments of this disclosure.
Figure 6B:
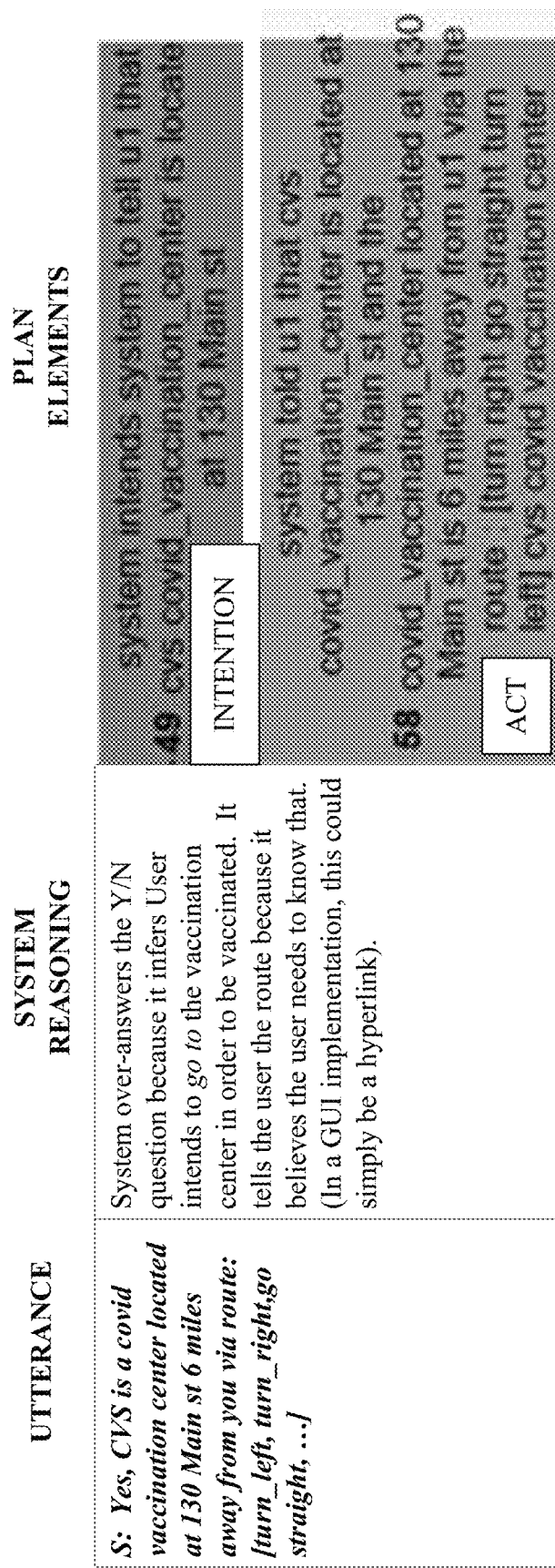
Figures 6E, 6F:
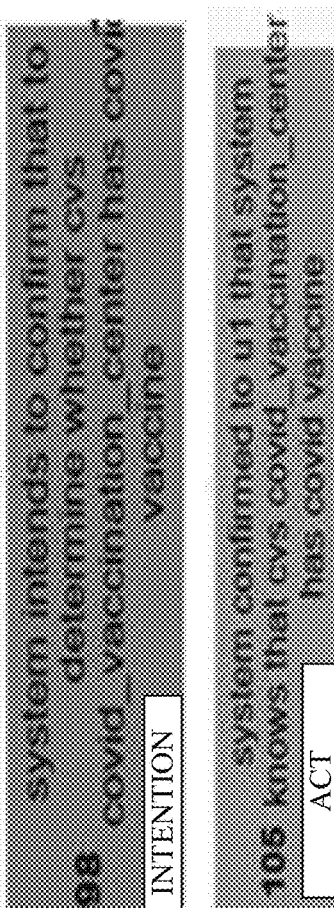
Figure 6G:
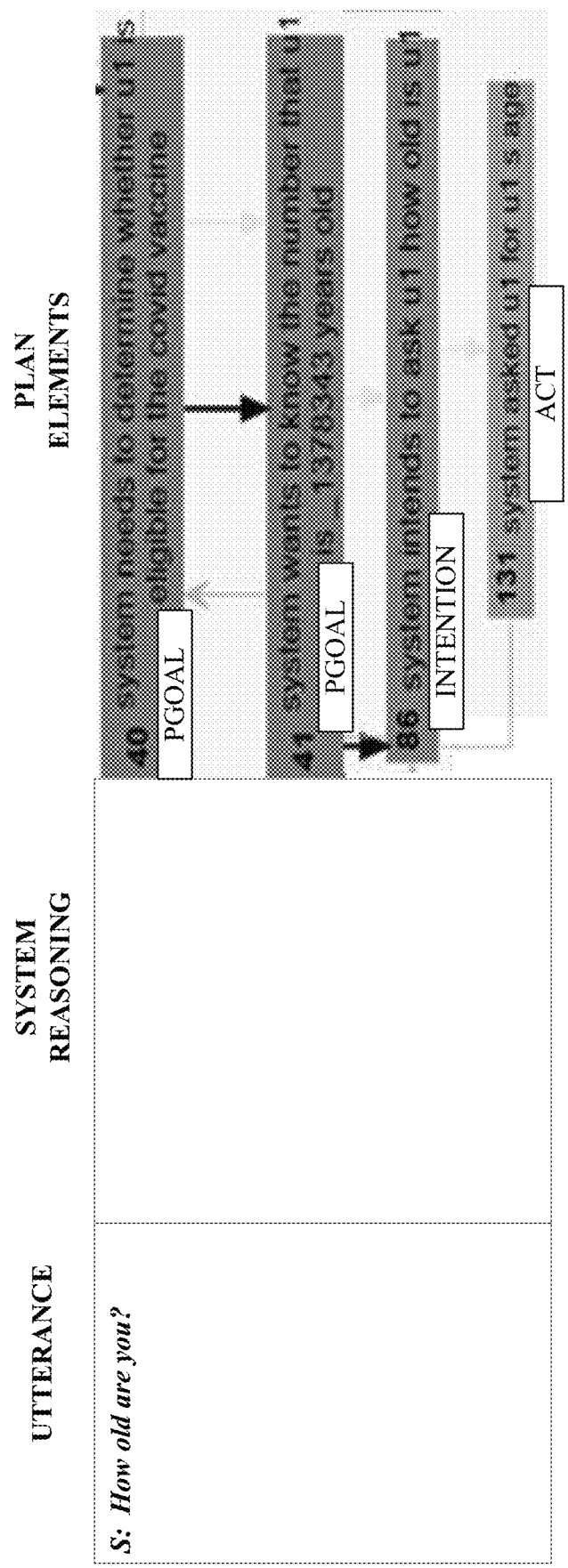
Figure 6H:
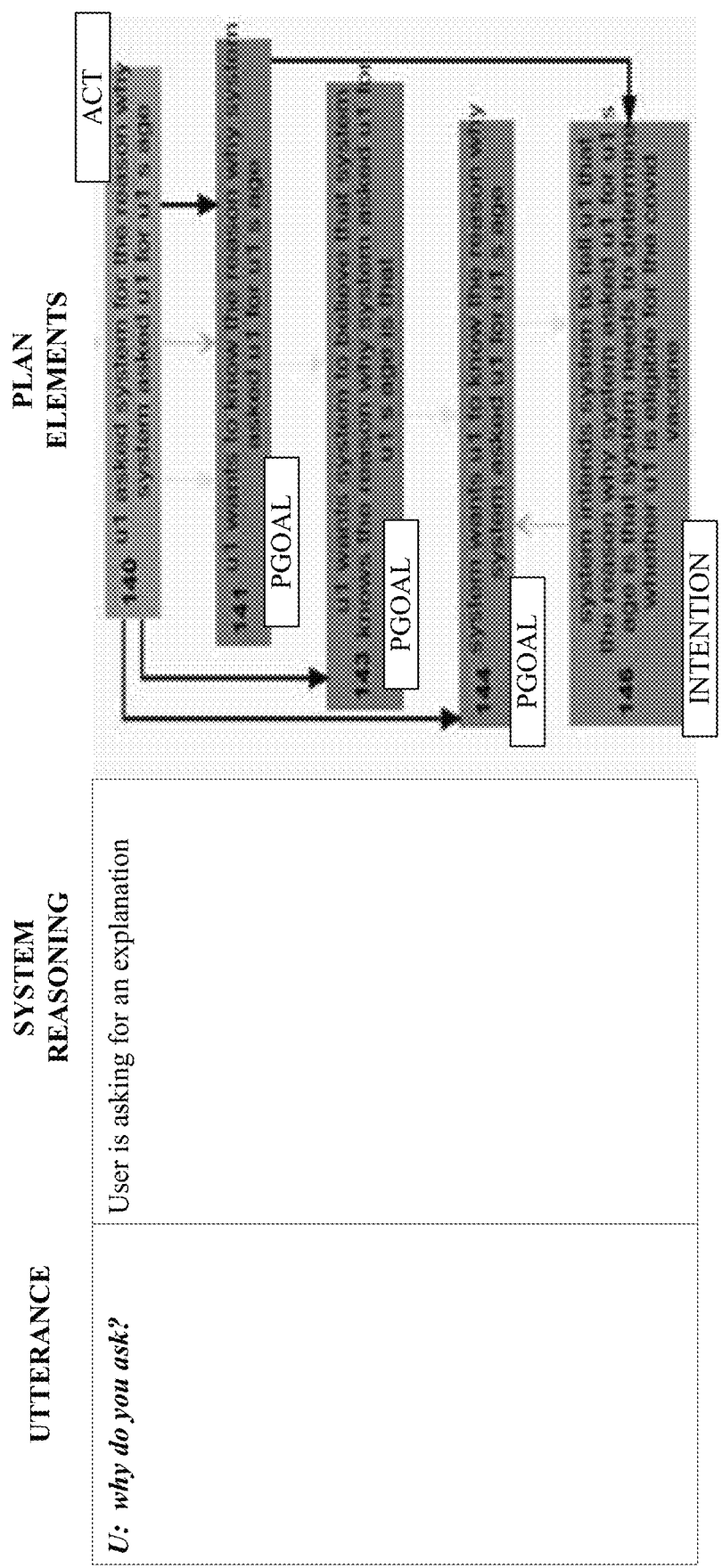
Figure 6J:
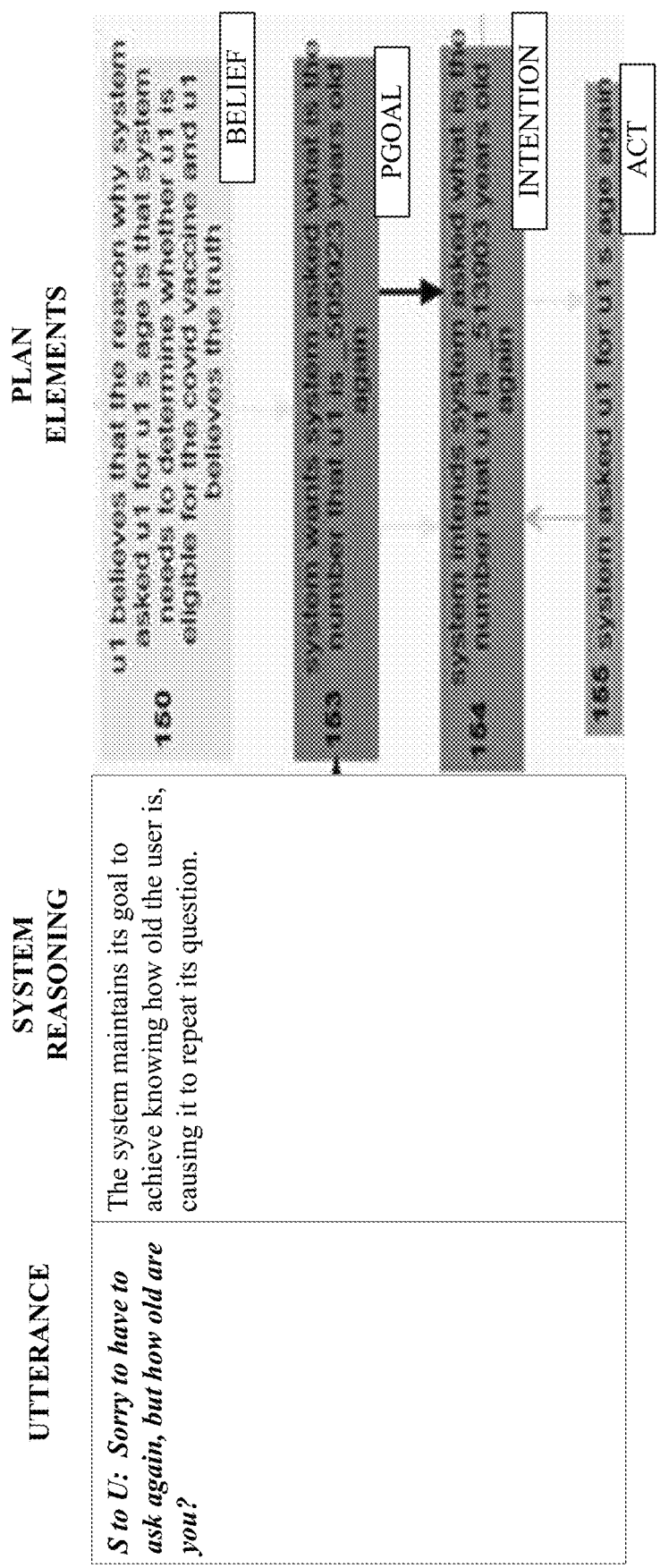
Figure 6O:
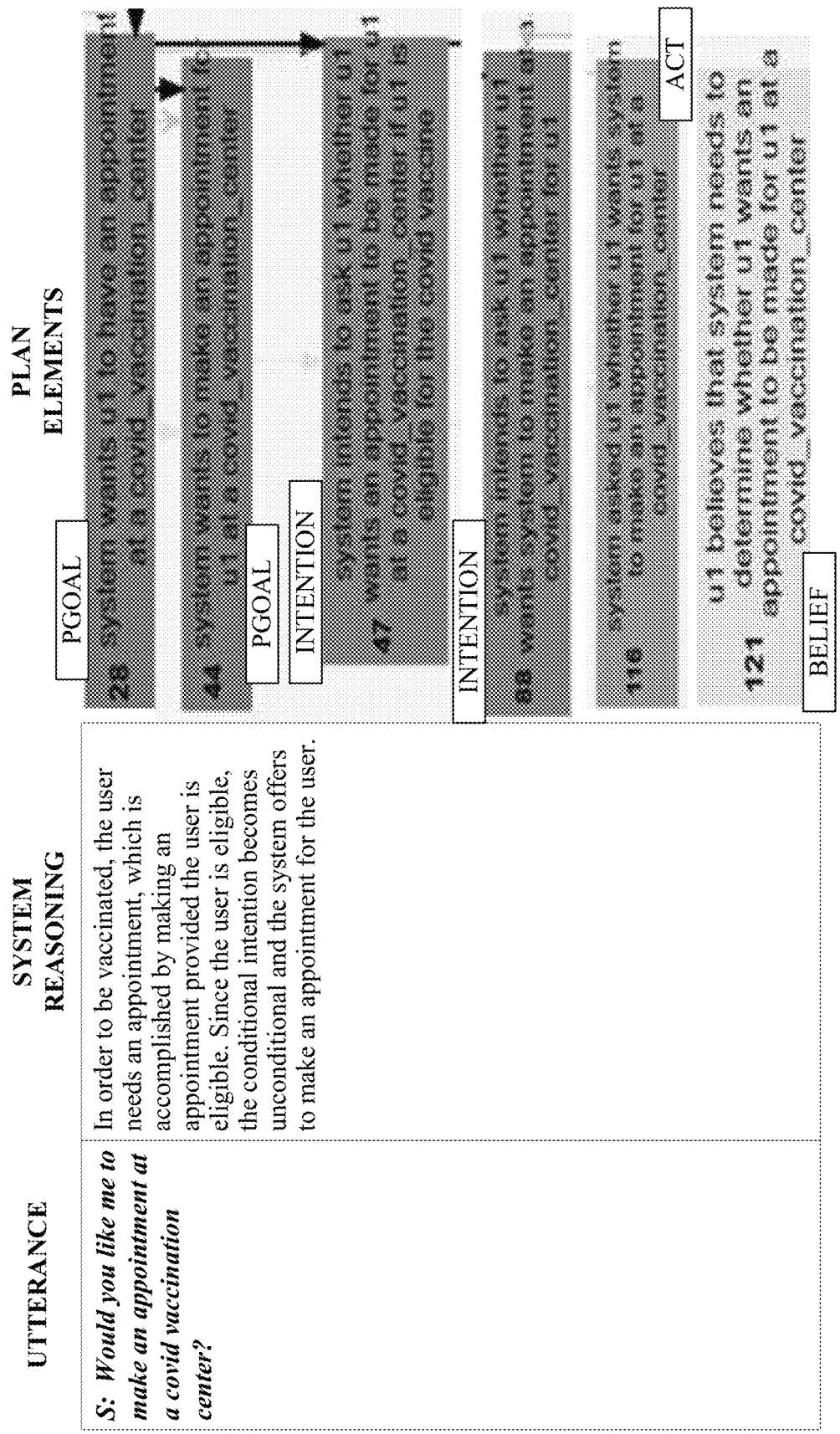
Figure 6R:
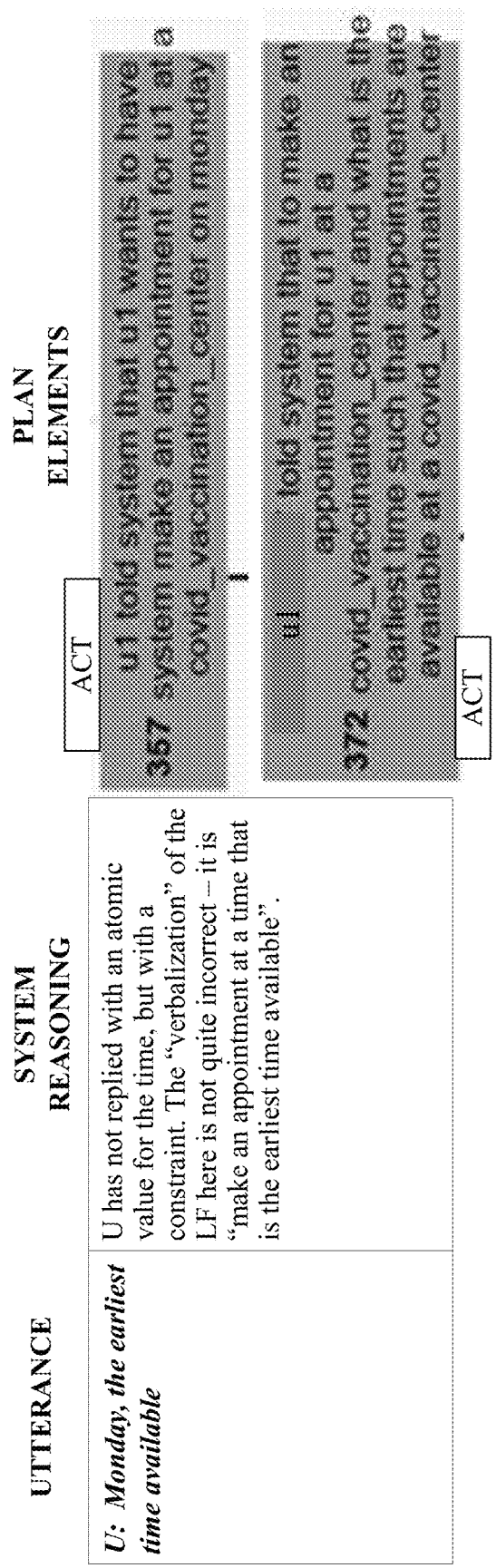
Figure 6S:
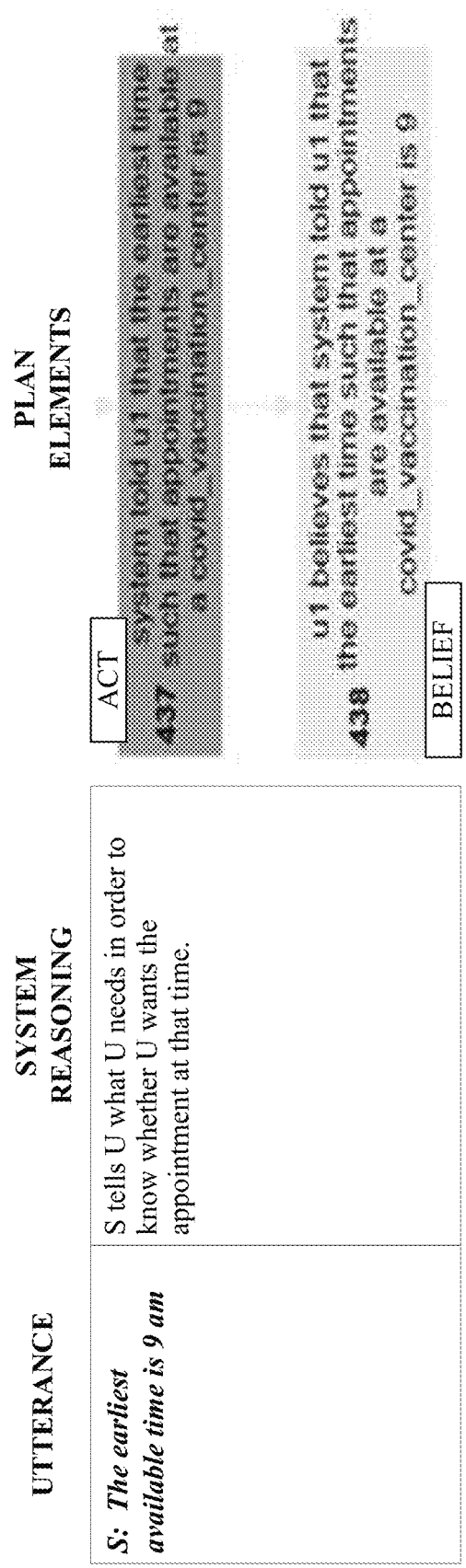

Referring now to also FIGS. 6A-V, which illustrates the dialogue, with an English gloss of what the system is doing, and a gloss of the system's reasoning in the plan display. Elements of the plan that begin with "_<variable name>" are unbound variables. Whereas the reasoning employs the logical formulas shown above, the system provides a "clunky" paraphrase of them in the plan display, enabling us to know how it is reasoning. Each of the plan elements are identified as or annotated with an act that has been done, a pgoal, an intention, or a belief. The numbers before each plan element show the order in which they were created. The system operates primarily in a breadth-first fashion, but deepening via action decomposition (as indicated by color of arrow).

At any time, the system may have multiple intentions, including communicative intentions, that could be executed. For example, at the same time it could have a rapport-building action ("that's terrible . . . ", "I'm sorry that . . . "), a confirmation, one or more informatives, a question to ask, and a request to pose. Some of these actions may change the "topic" of discussion, or begin work on a new goal, which can be introduced by discourse markers such as "ok, now", "so", etc. There may be mixed initiative digressions created by the user, such as seen in the example above when the user answers the question "how old are you?" with another question "why do you ask?", and with the conversation eventually being returned back to the original topic with a repetition of the prior speech act. Thus, there may be many possible choices for what action(s) to do next. Although one could imagine learning a policy for deciding among the actions to execute, the needed data for a new domain would be difficult to obtain, even with user simulators. As a result, the system, initially, executes speech actions from its set of enabled intentions in the following order (with examples drawn from to the above dialogue):

1. Rapport-building ("sorry to have to ask again,")
2. Confirmations ("OK, you are eligible for the Covid vaccine").
3. Informatives on the same topic ("the reason why . . . .")
4. Repetition of a prior speech act in order to return to a prior goal/topic ("but how old are you?")
5. Informatives on a new topic
6. A single directive or interrogative action, requiring a response from the user ("Are you caring for someone who is disabled?" "What date would you like the appointment?").

The definition of "topic" for various speech acts and goals is difficult. The system is provided with an initial topic analysis based on the structure of the logical form at issue.

The system maintains numerous types of context. First, at the logical form and linguistic levels, it maintains a chronologically-ordered done representation of all utterances and their speech acts, as well as domain actions, that have been performed by the dialogue participants. In addition, it keeps track of pgoals and intentions that it had, but have been retracted. It also maintains the instantiated intended effects of both party's speech acts. For example, the system's wh-question to the user "how old are you" is represented as the act:

whq(sys,user, Age #years^age_of(user,Age #years)), whose intended effect the system would maintain in the context database as:

knowref(sys, Age #years^age_of(user,Age #years)).

When the user says "55 years old", the parser generates the Value #Type variable expression 55 #years, which is unified with the variable: Var #Term of a contextual knowref effect formula accessed in reverse chronological order. This determines the predicate in question, enabling the system to identify the user's speech act as an informref(user, sys, 55 #years^age_of(user,55 #years)). Likewise, in processing "yes/no" answers and their variants, the system searches for a knowif(sys,predicate:Pred), and results in the user's speech act being a identified as an inform(user,sys,predicate: Pred) or inform(user,sys,predicate:~Pred). Context also informs numerous other aspects of the system's processing (e.g., to generate anaphoric expressions).

The system can advantageously provide an immediate mechanism to support the generation of explanations. Unlike black-box machine-learned systems, the system has a plan behind everything that it says or does, such that it can answer questions like "why did you say that?" The explanation finds the path in the plan starting from the action being referred to, and follows the chain of achievements, enablements, and relativizations to the intentions and persistent goals that led to the action to be explained. For example:

S: "how old are you?"
U. "why do you ask?"
S: "The reason is that I need to determine whether you are eligible for the Covid vaccine"

For example, in the dialog above, a good explanation would not be that the system asked for the user's age because it wanted to know the answer! Although that is the closest pgoal in the plan, that answer is likely something that the user already knows (S and U both are taken to know what the desired effect of a wh-question speech act is). On the other hand, a good explanation is also not one where the system asks the question because the user wants to be vaccinated, which is at the top of the plan tree. For the answer to the explanation request to be reasonable, the system needs to provide a rationale that the precondition of being vaccinated is eligibility and knowing the user's age is a necessary condition for determining eligibility.

The system also engages in proactive explanation by informing the user of preconditions of actions as goals the system needs to achieve. For example, it says: "In order to help you file a claim for that, I need to have identified your phone". Importantly, as with any action, the system checks whether the effect is already true, i.e., for an inform, whether the user already believes propositional content. In particular, some of the preconditions are stated as being general common knowledge. For example, to have someone receive a vaccination at a vaccination center, the person needs to be located at the vaccination center. Because that proposition's being a precondition (as opposed to its truth) is common knowledge, the system does not plan an inform speech act of the need for this proposition. But notice that it does recognize the user's plan to achieve her being at the vaccination center, and collaborates by telling the user what she would need to know, namely, how to drive there. The overall plan-based framework of the system inherently supports explanation.

The system engages its users in cooperative plan-based task-oriented dialogues by reasoning with and planning to affect the mental states of its users. It formalizes the plan-based approach to speech acts with the analysis of intention and speech acts. The system provides a principled analysis and reasoning process underlying conversational interaction. The system uses a declarative BDI reasoning and planning framework. The system engages in real-time mixed initiative collaborative dialogues, using multimodal inputs and outputs. The conversational capabilities include planning of a variety of speech acts, context-dependence, constraint processing in response to slot-filling questions, mixed initiative, over-answering by system and user, multi-agent dialogue based on models of the mental states of more than one agent. The system's conversational capabilities are domain independent as applied to domain dependent actions and knowledge.

The system uses a domain-independent model of dialogue processing that is applied to domain-dependent knowledge: examples include, "how to get a vaccination", or "how to file an insurance claim."

In some implementations, a collaborative plan-based dialogue system uses the same planning algorithm to plan communicative and non-communicative actions. The collaborative plan-based dialogue system uses declarative, logic-based knowledge representation to support modal logic reasoning about its own and other agents' mental states, including beliefs, persistent goals, and intentions.

In some implementations, the collaborative plan-based dialogue system uses a user model for knowledge representation. The system represents and reasons with modal formulas. For "belief", the system represents and reasons with arbitrarily deep embeddings of system believes user believes that system believes . . . and so on. The system has incomplete beliefs about user's beliefs. So, system represents 1) Knowref(Usr, Var,Pred): user knows the referent of the description "the Var such that Pred". For example, "the Date such that birthdate(user, is Date). In other words, the user knows what his/her birthdate is. This is represented in terms of a quantified belief (but that is not so easily described in English); and 2) Knowif(User, P): the user knows whether P holds, i.e., the user believes P is true or believes P is false. With respect to internal commitments (persistent goal and intention), the represents and reasons as follows. For Persistent Goal(Agt, P, Rel), Agt has a persistent goal (is internally committed) to achieve P relative to formula Rel. <definition of PG>. Agt can give up the persistent goal if it believes P is true, is impossible, or does not believe Rel is true. For Intention(Agt,Act,Rel), Agt has a persistent goal to (eventually) have done an action relative to formula Rel. For Common knowledge, what everyone believes. For example, it is common knowledge that in order to service a car at a repair shop, the car needs to be located at the repair shop. For Action, actions are described with a signature list of arguments (roles, values and their types), and formulas preconditions, effects, applicability conditions, and constraints. For Rules, P is true if Q. For Defaults, the Agt believes P is true if it cannot prove ~P. For example, by default, the system believes the user's car is driveable unless the user has had a car accident.

In some implementations, for the User Model, the system attributes default beliefs to the user. By default, the user knows what his/her birthdate, what his/her Social Security number is, etc. Defaults can be used to describe other aspects of the user's mental state. For example, by default, the user knows what she wants (i.e., what her persistent goals and intentions are).

In some implementations, the collaborative plan-based dialogue system uses planning and plan recognition. A hybrid planning algorithm uses both hierarchical planning and backward-chaining as applied to action descriptions expressed using preconditions, applicability conditions, constraints, and effects. The planning uses descriptions of speech act operators, such as request, wh-question, yes-no question, assertions, informatives, confirmations, offers, recommendations, etc.

In some implementations, action descriptions that incorporate the usual preconditions and effects, but uniquely, the use of applicability conditions that must be true for an action to be applicable, but cannot be made true by that agent. If such applicability conditions are believed by the agent to be false, as opposed to unknown, the agent believes the action to be impossible, so must drop any intention to do it, and the subtree of any plans that depend on the impossible intention. Hierarchical descriptions of actions incorporate conditional, sequential, disjunctive, and simultaneous actions. Preconditions and effects of higher-level action are derived from the preconditions and effects of the combination of lower level ones.

In some implementations, a collaborative plan-based dialogue system is disclosed whose planning operators may contain preconditions that are common knowledge, so the system does not need to inform them (e.g., a car needs to be at a repair shop in order for that repair shop to service the car there). The system still needs to reason with those preconditions, such as to make them true (leading it to offer to get your car towed to the repair shop).

In some implementations, the systems uses a plan recognizer that reasons as follows. If the system attributes to the user a persistent goal to achieve P, and P is the precondition of an action A, then the user may have a persistent goal to perform A. If there are more than one such action (A1, A2 . . . An), then the user may have a precondition to perform a complex action, here a disjunction of them, i.e., A1 or A2 or A2. If the user has a persistent goal to achieve an Action A, and the effect of A is formula E, then the user may have a persistent goal to achieve E. If the User has a persistent goal to know whether (knowif) something X exists, then the user may have a persistent goal to know what that X is (knowref). If the user has a persistent goal to go somewhere, then the user may have a persistent goal to do the normal activity done there. For example, if the user has a persistent goal to go to a movie theater, then the user may want to watch movie. If the system believes the user is in a negative state, it will attribute to the user the persistent goal to be in a corresponding positive state. For example, if the system believes the user's car has been stolen, the user may have the persistent goal to have that car replaced.

In some implementations, the system uses language for describing actions which uses full modal logic expressions to express the conditions. The language for describing actions can have actions embedded within actions (e.g., a request action has an embedded requested action).

In some implementations, the system uses a planner that reasons as follows. If the system has a persistent goal to achieve formula E, and E is the effect of an action A, then the system has a persistent goal to perform A, provided that 1) The system believes the applicability condition (AC) for A is true; 2) If the system believes AC is false, then the system records that A is not_applicable, removes A, and prevents any future planning to perform A.; and 3) If the system does not knowif AC is true, it creates a persistent goal to knowif AC is true, and blocks the persistent goal to perform A, thereby preventing any other planning to be performed on A until it believes AC is true, at which point it unblocks A. If the system has a persistent goal to perform A, and PC is a precondition for A, then the system creates a persistent goal to achieve PC. By the definition of persistent goal, if the system believes PC is true, it does not need to create the persistent goal to achieve PC. An agent's persistent goals to perform an actions constitute the agent's intentions to do A.

With respect to intending to perform a complex action, the system processes as follows. An agent A's intending to perform a conditional action conditional(P,Act) entails the agent A's intending to do Act provided the agent believes P is true. An agent's intending to do a mutually-exclusive disjunction of two actions Act1 and Act2 entails the intention to do Act1 when Act2 has not been done, or do to Act2 when Act1 has not been done. Intending to perform a sequence Act1; Act2 entails intending to perform the Act1, and then intending to perform the conditional action (Act2, when Act1 has been done). This decomposition can continue down an entire sequence of actions (e.g., intending to do Act3 when Act2 has been done). Intending to do two (or more) actions simultaneously is an intention to do each of them starting at the same time. This may involve having multiple output modalities (e.g., speech and gesture) that need to be coordinated.

In some implementations, with respect to reasoning, the system processes as follows. A modal logic reasoner based on Horn-clause logic, using two meta-interpreters. One for proving, and one for asserting facts into the database. The latter decomposes the associated logical sentence into its constituent (simpler) predicates for making the database consisting of smallest logical formulae possible. The system maintains the rational balance among the three modalities, especially the dropping of intentions and persistent goals when they are found to be impossible or irrelevant, using the relativization condition of C&L90a. Incorporation of equality reasoning that respects the modal operators (belief, persistent goal, intention) such that equalities do not pass through them. Maintains equivalence classes of equalities, e.g., Class 1: the vaccination center that you want to go to equals the vaccination center where you will be vaccinated.; Class 2: the time at which you want to be at the vaccination center equals the time at which you will be vaccinated.

In some implementations, with respect to execution of intended actions, the system processes as follows. System chooses communicative intention to execute within 7 categories: 1) rapport-building ("sorry to have to ask again,"); 2) confirmations ("OK, you are eligible for the Covid vaccine"); 3) informatives on same topic ("the reason why . . . "); 4) repetition of a prior speech act in order to return to a prior goal/topic ("but how old are you?"); 5) informatives on a new topic; 6) a single directive or interrogative action, requiring a response from the user ("Are you caring for someone who is disabled?" "What date would you like the appointment?") on the same topic as the current one.; and 7) single directive or interrogative on a new topic. For non-communicative actions, the system executes them when they are enabled (preconditions and applicability conditions are true).

In some implementations, with respect to communicative actions and logical forms, the system processes as follows. All speech acts have a topic, which is based on the logical form of the propositional content of that action. When executing intended communicative actions, the system prefer to execute those whose topic is the same as the topic of a communicative action that was most recently performed.

In some implementations, the collaborative beliefs-desire-intention architecture includes a main loop of: 1) infer user's plan(s), 2) Debug them, finding obstacles, 3) Plan to overcome those obstacles, and 4) Execute the plan, causing communication or other actions. The planner and plan-recognizer are embedded in a "belief/persistent goal/intention" algorithm using declarative (logical) representations of belief, persistent goal, and intention in a modal logic. The architecture obeys the principles and uses the same formulas as found in CL 1990a. For the intention/plan revision, the system drops goals and intentions if it believes their relativization conditions are false or the goals/intentions become impossible. Any goals and intentions depending solely on those dropped goals/intentions themselves become dropped, etc. Execution of a hierarchically described complex action results in the assertion that the system is doing the higher level action, though it is executing a constituent lower-level action. If the system plans and executes an action request to a backend service Act (e.g., credit card validation), and it fails (e.g., invalid credit card), the reasoning system records failure(Act) and attempts to find another plan (asks for another credit card). For generating goals to knowref, the system generates persistent goals to knowref the value of an obligatory argument to an action that it (or the user) intends to perform, and to obligatory arguments to predicates that it has a goal to evaluate. The system generates persistent goals to know whether or not a predicate P holds if P is a precondition or applicability condition for an intended action. The system generates persistent goals to know whether or not the condition of an intended conditional action holds before trying to execute that action. If the system has a persistent goal to knowif predicate P holds, and that predicate is defined in terms of a Prolog rule, the system's meta-interpreter decomposes the rule into conjunctions, and generates persistent goals to achieve the conjuncts, provided they do not share variables. If they do share variables, the meta-interpreter keeps the conjuncts together as part of a persistent goal. For example, if P is defined as Q and R, the system has a persistent goal to know if P holds, it generates the persistent goal to know if Q and the persistent goal to know if R, each of which is relative to the persistent goal to know if P, provided that Q and R do not share variables. If they do, it generates the persistent goal to knowif(Q & R).

In some implementations, with respect to communicative (speech) action, the system processes as follows. Speech acts include wh-questions, yes-no questions, ask-which questions, verification questions, requests, informs, assertions, confirmations, rapport-building actions ("that's terrible"), offers, acceptances, rejections, positive answers (e.g., "yes", "sure"), negative answers ("no,", "no, thanks", "negative,"). In order to ask a wh-question, the speaker believes the listener knows the answer, without knowing what the listener knows (or it would not need to ask). Speaker has incomplete knowledge of listener's mental states. "Speaker" and "Listener" can be any agent, including another artificial agent. Effect of verification question of the value of function F, is that the speaker wants to know what the listener thinks to be the value of F. The speaker already knows what the value of F is and is making a comparison. Multi-agent interaction based on reasoning about mental states of those agents, e.g., reasoning that an FAQ agent knows the definitions of terms, so the system plans a "question" (in an artificial or natural language) to find out the definition. The effects of user requests are that the system forms the intention to do the requested action relative to the user's wanting it to do so. If the system comes to believe the user does not want it to do so, it can drop the intention.

In some implementations, natural language generation uses a hierarchical generator that decomposes the logical form structure and creates "canonical" utterances. These are then paraphrased using large language models (LMs) to produce realistic natural language. These canonical utterances are also provided to crowd workers in order to generate human paraphrases.

In some implementations, the system generates pronouns and co-referring expressions when a logical form element (an entity or action) that it is attempting to render in natural language has been part of the last dialogue turn (by system or user). It first generates a shortened noun phrase, and then subsequently a pronoun. The generation of the pronoun depends on the syntactic type of the entity, the gender (for he vs she).

In some implementations, interpretation of speech acts from utterances—the system uses a semantic parser that maps utterances into the complex logical forms that are contents of the communicative acts. The system employs a deeply learned neural sequence-to-sequence semantic parser whose encoder is a pre-trained language model XLM-RoBERTa (multi-lingual Robust BERT) that has been fine-tuned on pairs of utterances and logical form (LF) meaning representations. The parser returns an LF representation that incorporates both the communicative action as well as its propositional content. These LFs are then input to the plan recognition component that starts reasoning about the user's speech act(s) and what s/he was trying to achieve in performing them. The training of the parser is begun with "canonical" (affectionately known as "clunky") utterances generated from logical forms that are derived from the backend application. These canonical utterances are then paraphrased into natural language, using both machine resources and crowd-sourcing. Because the system makes use of a large-scale multi-lingual language model (XLM-RoBERTa) during the parsing process, when building the system to be used in a language other than English, a relatively small amount of human-generated paraphrases of the canonical utterances can be gathered in that language and added to the training data.

In some implementations, with respect to contextual interpretation, the system will first attempt to interpret an utterance contextually. The system maintains a context consisting of the ordered Effects of all the prior communicative actions, the actions that have been done (in order), and the system's intentions as a context, under the assumption that the user is inferring the system's intentions. Utterance interpretation uses these context elements to determine a complete logical form when the user only supplies a fragment. For example, if the system asks "which repair shop would you like to repair your car?", and the user replies "Toyota of Marin", the system creates a complete logical form for the response from the effects of the question (system wants to know the referent of "the repair shop where user wants to repair his car", which it unifies with the entity to create a logical form that Toyota of Marin is the repair shop where the user would like to have his car repaired". System intentions are used in contextual interpretation when the user "over answers" a question. For example, when the user is asked "what day would you like the appointment?", and replies "Monday before 10", the entity Monday is interpreted as above, and "at 10" is interpreted with respect to the system's unexecuted intention to ask for the time when the user wants the appointment.

In some implementations, with respect to constraints, the user can respond with a constraint rather than a mere atomic value to "fill a slot." For example, when asked "what time do you want to eat?", the user can respond with "the earliest time available" rather than a specific time. Constraints expressed in natural language are parsed into logical form expressions that are appended as conjunctions with unified variables onto the formula in the constraint field for the prior speech act. Thus, the interpretation is that the user wants to at time T such that earliest(T, available(T)). By answering in this way, the system must retract its prior belief that the user knows the referent of the expression in the question (here, the time s/he wants to eat), which enabled the system to ask the user that question.

In some implementations, with respect to an explanation via a plan, the system maintains a complex plan representation that keeps track of all goals and intentions. The goals and intentions are related to one another via dependency links (implemented as the relativization parameter of persistent goals and intentions). Goals and intentions are also marked as being in achieves and enables relations, such that intended actions achieve the desired effects of those actions (as persistent goals), and persistent goals that preconditions be true enable the intended actions for which they are the precondition. When the user asks for an explanation of a system action A, the system finds the nearest plan step (persistent goal or intended action), and then examines the plan for the next highest (in dependency/achievement/enablement ordering) intended action. That intended action then becomes the reason why the system did A.

In some implementations, proactive explanations are created by informing the user of preconditions for intended actions: "I am going to need to identify your stolen phone" "I need to determine whether you are eligible for the covid vaccine", "I will need a photograph of the damage to your car".

In some embodiments, a multimodal collaborative plan-based dialogue method includes obtaining, by one or more sensors in cooperation with a multimodal avatar interface in a multimodal collaborative plan-based dialogue system from a user, one or more multimodal inputs including at least one of utterances, speech, text, touch-based input, gestures, facial expressions, audio, video, body language, visual, body postures, eye gaze, and lip reading A semantic parser and multimodal fuser in the multimodal collaborative plan-based dialogue system generates one or more logical form representations based on the one or more multimodal inputs. A dialogue manager in the multimodal collaborative plan-based dialogue system infers a goal of the user from the one or more logical form representations, and develops a plan including communicative actions and non-communicative actions with regard to the goal. The multimodal avatar interface outputs one or more multimodal collaborative plan-based dialogue system-generated communications with respect to execution of at least one communicative action. The dialogue manager maintains a collaborative dialogue via obtaining, generating, inferring, developing, and outputting until obtainment of the goal.

In some embodiments, the method further includes the dialogue manager generating linguistic and multimodal communications with respect to the at least one communicative action, and the multimodal avatar interface outputting the linguistic and multimodal communications. In some embodiments, the dialogue manager generates knowledge acquisition goals by processing one or more constraints and applying domain rules-based reasoning with respect to the goal. In some embodiments, the dialogue manager identifies entities possessing relevant information with respect to the knowledge acquisition goals. In some embodiments, the dialogue manager determines questions to ask the entities possessing the relevant information with respect to the knowledge acquisition goals. In some embodiments, the dialogue manager generates facial gestures, and rapport-utterances to signal one or more emotional states, and wherein the multimodal avatar interface outputs the facial gestures and rapport-utterances. In some embodiments, the dialogue manager in cooperation with a reasoner in the collaborative plan-based dialogue system, generates empathic expressions by analyzing emotional cues with respect to the one or more multimodal inputs and the one or more one or more logical form representations, and wherein the multimodal avatar interface outputs the empathic expressions. In some embodiments, the dialogue manager engages in goal-oriented interactions to form and maintain self-beliefs and beliefs regarding user goals and intentions. In some embodiments, the dialogue manager generates epistemic goals, wherein the epistemic goals in conjunction with a model of the user's mental states support slot-filling processing in the collaborative plan-based dialogue system. In some embodiments, the dialogue manager generates proactive information communications to inform the user about information deemed relevant to the goal, and wherein the multimodal avatar interface outputs the proactive information communications. In some embodiments, the dialogue manager generates explanation communications to enhance user understanding of the plan, and wherein the multimodal avatar interface outputs explanation communications. In some embodiments, the dialogue manager generates hierarchical descriptions of actions incorporating conditional, sequential, disjunctive, and simultaneous actions, and wherein the multimodal avatar interface outputs at least a portion of the hierarchical descriptions in response to user inquiry.

In some embodiment, a multimodal collaborative plan-based dialogue system includes a multimodal avatar interface, one or more sensors, the one or more sensors and the multimodal avatar interface configured to obtain one or more multimodal inputs including at least one of utterances, speech, text, touch-based input, gestures, facial expressions, audio, video, body language, visual, body postures, eye gaze, and lip reading, a multimodal semantic parser configured to generate one or more logical form representations based on the one or more multimodal inputs, a collaborative dialogue manager configured to infer a goal of the user from the one or more logical form representations, develop a plan including communicative actions and non-communicative actions with regard to the goal, the multimodal avatar interface configured to output one or more multimodal collaborative plan-based dialogue system-generated communications with respect to execution of at least one communicative action, and the collaborative dialogue manager configured to maintain a collaborative dialogue with the user until obtainment of the goal.

In some embodiments, the collaborative dialogue manager is further configured to generate linguistic and multimodal communications with respect to the at least one communicative action and the multimodal avatar interface is further configured to output the linguistic and multimodal communications. In some embodiments, the collaborative dialogue manager is further configured to generate knowledge acquisition goals by processing one or more constraints and applying domain rules-based reasoning with respect to the goal, identify entities possessing relevant information with respect to the knowledge acquisition goals, and determine questions to ask the entities possessing the relevant information with respect to the knowledge acquisition goals. In some embodiments, the collaborative dialogue manager is further configured to generate facial gestures and rapport-utterances to signal one or more emotional states and generate, in cooperation with a reasoner in the collaborative plan-based dialogue system, empathic expressions by analyzing emotional cues with respect to the one or more multimodal inputs and the one or more one or more logical form representations, and the multimodal avatar interface is further configured to output the facial gestures and rapport-utterances and the empathic expressions. In some embodiments, the collaborative dialogue manager is further configured to engage in goal-oriented interactions to form and maintain self-beliefs and beliefs regarding user goals and intentions, and generate epistemic goals, wherein the epistemic goals in conjunction with a model of the user's mental states support slot-filling processing in the collaborative plan-based dialogue system. In some embodiments, the collaborative dialogue manager is further configured to generate proactive information communications to inform the user about information deemed relevant to the goal and the multimodal avatar interface is further configured to output the proactive information communications. In some embodiments, the collaborative dialogue manager is further configured to generate explanation communications to enhance user understanding of the plan and the multimodal avatar interface is further configured to output the explanation communications. In some embodiments, the collaborative dialogue manager is further configured to generate hierarchical descriptions of actions incorporating conditional, sequential, disjunctive, and simultaneous actions and the multimodal avatar interface is further configured to output at least a portion of the hierarchical descriptions in response to user inquiry.

While the embodiments described herein may be susceptible to various modifications and alternative forms, specific embodiments thereof are shown by way of example in the drawings and will be described in detail below. It should be understood, however that these examples not intended to limit the embodiments to the particular forms disclosed, but on the contrary, the disclosed embodiments cover all modifications, equivalents, and alternatives falling within the spirit and the scope of the disclosure as defined by the appended claims.

The method steps have been represented, wherever appropriate, by conventional symbols in the drawings, showing those specific details that are pertinent to understanding the embodiments so as not to obscure the disclosure with details that will be readily apparent to those of ordinary skill in the art having benefit of the description herein.

The terms "comprises," "comprising," or any other variations thereof, are intended to cover a non-exclusive inclusion, such that a process, method that comprises a list of steps does not include only those steps but may include other steps not expressly listed or inherent to such process or method. Similarly, one or more elements in a system or apparatus proceeded by "comprises . . . a" does not, without more constraints, preclude the existence of other elements or additional elements in the system or apparatus.

The features of the present embodiments are set forth with particularity in the appended claims. Each embodiment itself, together with further features and attended advantages, will become apparent from consideration of the following detailed description, taken in conjunction with the accompanying drawings.

The disclosed embodiments describe retrieving and organizing information from a set of applications, data sources, or both, by performing various steps as is described in details in forthcoming sections. For the sake explanation and understanding, reference is drawn towards a typical search query where the process heavily relies on multimodality technology for converging speech, text, images, touch, language, and the like. Success of such a multimodality platform mainly depends on how good and relevant the obtained results are.

Having described and illustrated the principles with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein.

Elements of the described embodiments shown in software may be implemented in hardware and vice versa. As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine-readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory. Modules can be defined by executable code stored on non-transient media.

The following description is presented to enable a person of ordinary skill in the art to make and use the embodiments and is provided in the context of the requirement for a obtaining a patent. The present description is the best presently-contemplated method for carrying out the present embodiments. Various modifications to the embodiments will be readily apparent to those skilled in the art and the generic principles of the present embodiments may be applied to other embodiments, and some features of the present embodiments may be used without the corresponding use of other features. Accordingly, the present embodiments are not intended to be limited to the embodiments shown but are to be accorded the widest scope consistent with the principles and features described herein.

What is claimed is:

1. A multimodal collaborative plan-based dialogue method comprising:
    obtaining, by one or more sensors in cooperation with a multimodal avatar interface in a multimodal collaborative plan-based dialogue system from a user, one or more multimodal inputs including at least one of utterances, speech, text, touch-based input, gestures, facial expressions, audio, video, body language, visual, body postures, eye gaze, and lip reading;
    generating, by a semantic parser and multimodal fuser in the multimodal collaborative plan-based dialogue system, one or more logical form representations based on the one or more multimodal inputs;
    inferring, by a dialogue manager in the multimodal collaborative plan-based dialogue system, a goal of the user from the one or more logical form representations;
    developing, by the dialogue manager, a plan including communicative actions and non-communicative actions with regard to the goal;
    outputting, by the multimodal avatar interface, one or more multimodal collaborative plan-based dialogue system-generated communications with respect to execution of at least one communicative action; and
    maintaining, by the dialogue manager, a collaborative dialogue via the obtaining, the generating, the inferring, the developing, and the outputting until obtainment of the goal.

2. The method of claim 1, further comprising:
    generating, by the dialogue manager, linguistic and multimodal communications with respect to the at least one communicative action; and
    wherein the outputting further comprises:
        outputting, by the multimodal avatar interface, the linguistic and multimodal communications.

3. The method of claim 1, wherein the maintaining further comprises:
    generating, by the dialogue manager, knowledge acquisition goals by processing one or more constraints and by applying domain rules-based reasoning.

4. The method of claim 3, wherein the generating knowledge acquisition goals further comprises:
    identifying, by the dialogue manager, entities.

5. The method of claim 4, wherein the generating knowledge acquisition goals further comprises:
    determining, by the dialogue manager, questions to ask the entities.

6. The method of claim 1, further comprising:
    generating, by the dialogue manager, facial gestures and rapport-utterances to signal one or more emotional states; and wherein the outputting further comprises:
outputting, by the multimodal avatar interface, the facial gestures and rapport-utterances.

7. The method of claim 1, further comprising:
generating, by the dialogue manager in cooperation with a reasoner in the multimodal collaborative plan-based dialogue system, empathic expressions by analyzing emotional cues with respect to the one or more multimodal inputs and the one or more logical form representations; and
wherein the outputting further comprises:
outputting, by the multimodal avatar interface, the empathic expressions.

8. The method of claim 1, wherein the maintaining further comprises:
engaging, by the dialogue manager, in goal-oriented interactions to form and maintain self-beliefs and beliefs regarding user goals and intentions.

9. The method of claim 1, wherein the developing further comprises:
generating, by the dialogue manager, epistemic goals, wherein the epistemic goals in conjunction with a model of the user's mental states support slot-filling processing in the multimodal collaborative plan-based dialogue system.

10. The method of claim 1, further comprising:
generating, by the dialogue manager, proactive information communications to inform the user about information deemed relevant to the goal; and
wherein the outputting further comprises:
outputting, by the multimodal avatar interface, the proactive information communications.

11. The method of claim 1, further comprising:
generating, by the dialogue manager, explanation communications to enhance user understanding of the plan; and
wherein the outputting further comprises:
outputting, by the multimodal avatar interface, explanation communications.

12. The method of claim 1, wherein the developing further comprises:
generating, by the dialogue manager, hierarchical descriptions of actions incorporating conditional, sequential, disjunctive, and simultaneous actions; and
wherein the outputting further comprises:
outputting, by the multimodal avatar interface, at least a portion of the hierarchical descriptions in response to user inquiry.

13. A multimodal collaborative plan-based dialogue system comprising:
a multimodal avatar interface;
one or more sensors, the one or more sensors and the multimodal avatar interface configured to obtain one or more multimodal inputs including at least one of utterances, speech, text, touch-based input, gestures, facial expressions, audio, video, body language, visual, body postures, eye gaze, and lip reading;
a multimodal semantic parser configured to generate one or more logical form representations based on the one or more multimodal inputs;
a collaborative dialogue manager configured to:
infer a goal of a user from the one or more logical form representations;
develop a plan including communicative actions and non-communicative actions with regard to the goal;
the multimodal avatar interface configured to output one or more multimodal collaborative plan-based dialogue system-generated communications with respect to execution of at least one communicative action; and
the collaborative dialogue manager configured to maintain a collaborative dialogue with the user until obtainment of the goal.

14. The system of claim 13, wherein the collaborative dialogue manager is further configured to generate linguistic and multimodal communications with respect to the at least one communicative action and the multimodal avatar interface is further configured to output the linguistic and multimodal communications.

15. The system of claim 13, wherein the collaborative dialogue manager is further configured to generate knowledge acquisition goals by processing one or more constraints and by applying domain rules-based reasoning, identify entities, and determine questions to ask the entities.

16. The system of claim 13, wherein:
the collaborative dialogue manager is further configured to generate facial gestures and rapport-utterances to signal one or more emotional states and generate, in cooperation with a reasoner in the multimodal collaborative plan-based dialogue system, empathic expressions by analyzing emotional cues with respect to the one or more multimodal inputs and the one or more logical form representations; and
the multimodal avatar interface is further configured to output the facial gestures and rapport-utterances and the empathic expressions.

17. The system of claim 13, wherein the collaborative dialogue manager is further configured to:
engage in goal-oriented interactions to form and maintain self-beliefs and beliefs regarding user goals and intentions; and
generate epistemic goals, wherein the epistemic goals in conjunction with a model of the user's mental states support slot-filling processing in the multimodal collaborative plan-based dialogue system.

18. The system of claim 13, wherein the collaborative dialogue manager is further configured to generate proactive information communications to inform the user about information deemed relevant to the goal and the multimodal avatar interface is further configured to output the proactive information communications.

19. The system of claim 13, wherein the collaborative dialogue manager is further configured to generate explanation communications to enhance user understanding of the plan and the multimodal avatar interface is further configured to output the explanation communications.

20. The system of claim 13, wherein the collaborative dialogue manager is further configured to generate hierarchical descriptions of actions incorporating conditional, sequential, disjunctive, and simultaneous actions and the multimodal avatar interface is further configured to output at least a portion of the hierarchical descriptions in response to user inquiry.

* * * * *